(12) United States Patent
Liu et al.

(10) Patent No.: US 12,185,339 B2
(45) Date of Patent: *Dec. 31, 2024

(54) INFORMATION SENDING METHOD AND DEVICE AND INFORMATION RECEIVING METHOD AND DEVICE

(71) Applicant: ZTE CORPORATION, Guangdong (CN)

(72) Inventors: Xing Liu, Shenzhen (CN); Peng Hao, Shenzhen (CN); Haigang He, Shenzhen (CN); Feng Bi, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/485,347

(22) Filed: Oct. 12, 2023

(65) Prior Publication Data

US 2024/0040579 A1    Feb. 1, 2024

Related U.S. Application Data

(63) Continuation of application No. 17/989,208, filed on Nov. 17, 2022, now Pat. No. 11,825,296, which is a
(Continued)

(30) Foreign Application Priority Data

Nov. 17, 2017    (CN) .......................... 201711148126.3

(51) Int. Cl.
*H04W 72/23* (2023.01)
*H04W 56/00* (2009.01)
(Continued)

(52) U.S. Cl.
CPC .......... *H04W 72/23* (2023.01); *H04W 56/001* (2013.01); *H04W 72/30* (2023.01); *H04W 72/0446* (2013.01)

(58) Field of Classification Search
CPC ... H04L 5/0007; H04L 5/0053; H04L 5/0094; H04W 56/001; H04W 72/0446; H04W 72/23; H04W 72/231; H04W 72/30
See application file for complete search history.

(56) References Cited

U.S. PATENT DOCUMENTS 10,674,485 B2 * 6/2020 John Wilson ......... H04W 72/20
11,159,294 B2   10/2021 Liu
(Continued)

FOREIGN PATENT DOCUMENTS

BR    112019027869 A2    7/2020
CN       106488509 A     3/2017
(Continued)

OTHER PUBLICATIONS

AT&T: "Remaining details of RMSI delivery" 3GPP TSG RAN WG1 Meeting #90; R1-1712697; Aug. 25, 2017; Prague, P.R. Czechia (2 pages).
(Continued)

*Primary Examiner* — Eric Nowlin
(74) *Attorney, Agent, or Firm* — Foley & Lardner LLP

(57) ABSTRACT

Information transmission and reception methods and apparatus are disclosed, where the transmission method includes: carrying configuration information of a control resource set on a physical broadcast channel; where the configuration information is used to indicate to a terminal at least one of the following of the control resource set: time domain position information and frequency domain position information; and transmitting the control resource set to the terminal according to the configuration information.

16 Claims, 14 Drawing Sheets

```
carrying configuration information of a control resource set on a
physical broadcast channel                                        ⎬ S102 transmitting the control resource set to a terminal according to
the configuration information                                     ⎬ S104
```

Related U.S. Application Data continuation of application No. 16/875,701, filed on May 15, 2020, now Pat. No. 11,528,694, which is a continuation of application No. PCT/CN2018/116114, filed on Nov. 19, 2018.

(51) Int. Cl.
  *H04W 72/0446* (2023.01)
  *H04W 72/30* (2023.01)

(56) References Cited

U.S. PATENT DOCUMENTS

| | | | | |
|---|---|---|---|---|
| 11,375,504 | B2* | 6/2022 | Liu | H04L 5/00 |
| 11,445,387 | B2* | 9/2022 | Bagheri | H04L 5/0035 |
| 11,528,694 | B2* | 12/2022 | Liu | H04L 5/0053 |
| 11,825,296 | B2* | 11/2023 | Liu | H04W 56/001 |
| 2018/0184410 | A1* | 6/2018 | John Wilson | H04W 72/20 |
| 2020/0053757 | A1* | 2/2020 | Bagheri | H04L 5/0044 |
| 2020/0145950 | A1 | 5/2020 | Harada et al. | |
| 2020/0162222 | A1 | 5/2020 | Liu | |
| 2020/0221404 | A1 | 7/2020 | Takeda et al. | |
| 2020/0221462 | A1 | 7/2020 | Tang | |
| 2020/0280938 | A1 | 9/2020 | Liu | |
| 2020/0366398 | A1 | 11/2020 | Takeda et al. | |
| 2022/0086842 | A1 | 3/2022 | Tang | |
| 2023/0083692 | A1* | 3/2023 | Liu | H04L 5/0094 |
| 2023/0254761 | A1* | 8/2023 | Noh | H04L 5/0051 370/329 |
| 2024/0040579 | A1* | 2/2024 | Liu | H04L 5/0053 |

FOREIGN PATENT DOCUMENTS

| | | | | |
|---|---|---|---|---|
| CN | 109391964 | A | 2/2019 | |
| CN | 109451799 | A | 3/2019 | |
| CN | 109495227 | A | 3/2019 | |
| CN | 109756449 | A | 5/2019 | |
| CN | 110622595 | A | 12/2019 | |
| CN | 111010737 | A | 4/2020 | |
| CN | 111630916 | A | 9/2020 | |
| CN | 109495227 | B | 10/2020 | |
| CN | 109756449 | B | 10/2020 | |
| CN | 112152769 | A | 12/2020 | |
| CN | 111010737 | B | 3/2021 | |
| CN | 109451799 | B | 7/2021 | |
| CN | 112152769 | B | 10/2021 | |
| EP | 3 624 524 | B1 | 3/2020 | |
| EP | 3 698 594 | A0 | 8/2020 | |
| EP | 3 713 329 | A1 | 9/2020 | |
| EP | 3 914 018 | A1 | 11/2021 | |
| EP | 3834351 | B1* | 10/2023 | H04L 5/0007 |
| ES | 2896914 | T3 | 2/2022 | |
| JP | 2020-534711 | A | 11/2020 | |
| JP | WO2019-097633 | A1 | 11/2020 | |
| JP | 7019793 | B2 | 2/2022 | |
| KR | 1020200037804 | A | 4/2020 | |
| KR | 20200083513 | A | 7/2020 | |
| KR | 102462432 | B1 | 11/2022 | |
| KR | 20220151228 | A | 11/2022 | |
| RU | 2748617 | C1 | 5/2021 | |
| SG | 11201910065 | W | 11/2019 | |
| WO | WO-2017/190631 | A1 | 11/2017 | |
| WO | WO-2018/198343 | A1 | 11/2018 | |
| WO | WO-2019/028773 | A1 | 2/2019 | |
| WO | WO-2019/095183 | A1 | 5/2019 | |
| WO | WO-2019/095890 | A1 | 5/2019 | |
| WO | WO-2019/096193 | A1 | 5/2019 | |
| WO | WO-2019/097633 | A1 | 5/2019 | |
| WO | WO-2019096291 | A1* | 5/2019 | H04L 5/00 |
| WO | WO-2021/012256 | A1 | 1/2021 | |
| WO | WO-2022080996 | A1* | 4/2022 | H04L 5/0053 |

OTHER PUBLICATIONS

AT&T: "Remaining details of RMSI delivery" 3GPP TSG RAN WG1 Meeting 90bis; R1-178379; Oct. 13, 2017; Prague, CZ (3 pages).

AT&T: "Remaining details of RMSI delivery" 3GPP TSG RAN WG1 Meeting NR#3; R1-1716161; Sep. 21, 2017; Nagoya, Japan (2 pages).

CATT, "Offline summary for AI 6.1.2.2 Remaining details on Remaining Minimum System Information" 3GPP TSG RAN WG1 Meeting NR#3, R1-1716806, Sep. 18, 2017, Nagoya, Japan (14 pages).

CATT, "Offline summary for AI 7.1.2.2 Remaining details on Remaining Minimum System Information", 3GPP TSG RAN WG1 Meeting 90bis, R1-1719145, Prague, Oct. 13, 2017 (15 pages).

CATT, "Offline summary for AI 7.1.2.2 Remaining details on Remaining Minimum System Information", 3GPP TSG RAN WG1 Meeting 90bis, R1-1719198, Prague, Oct. 13, 2017 (15 pages).

CATT, "Summary of Offline Discussion on Remaining Minimum System Information", 3GPP TSG RAN WG1 Meeting 91, R1-1721473, Dec. 1, 2017, Reno, USA (29 pages).

CATT: "Offline summary for AI 6.1.2.2 Remaining details on Remaining Minimum System Information" 3GPP TSG RAN WG1 Meeting NR#3; R1-1716806; Sep. 21, 2017; Nagoya, Japan (14 pages).

CATT: "Remaining details on Rmsi" 3GPP TSG RAN WG1 Meeting 90bis; R1-1717799; Oct. 13, 2017; Prague, CZ (6 pages).

CATT: "Remaining details on RMSI" 3GPP TSG RAN WG1 Meeting NR#3; R1-1715786; Sep. 21, 2017; Nagoya, Japan (5 pages).

CATT: "RMSI Delivery" 3GPP TSG RAN WG1 Meeting #90; R1-1712353; Aug. 25, 2017; Prague, Czechia (4 pages).

CATT: "RMSI Delivery" 3GPP TSG RAN WG1 NR Ad-Hoc #2; R1-1710029; Jun. 30, 2017; Qingdao, P.R. China (3 pages).

CMCC: "Common CORESET design for RMSI scheduling" 3GPP TSG RAN WG1 Meeting NR #3; R1-1716044; Sep. 21, 2017; Nagoya, Japan (5 pages).

CMCC: "CORESET Configuration for RMSI Scheduling" 3GPP TSG RAN WG1 Meeting NR Ad-Hoc #2; R1-1710773; Jun. 30, 2017; Qingdao, China (4 pages).

CMCC: Common CORESET design for RMSI scheduling 3GPP TSG RAN WG1 Meeting #90; R1-1713832; Aug. 25, 2017; Prague, P.R. Czech (5 pages).

Communication pursuant to Article 94(3) EPC on EP Appl. No. 18877712.2, dated Mar. 21, 2023 (3 pages).

Ericsson, "Remaining details of remaining minimum system information", 3GPP TSG RAN WG1 Meeting #91, R1-1720937. Dec. 1, 2017, Reno, Nevada, US (11 pages).

Examination Report on SG Appl. No. 11202004533T, dated May 30, 2023 (5 pages).

Extended European Search Report for EP Appl. No. 18877712.2, dated Sep. 28, 2021 (11 pages).

Extended European Search Report for EP Appl. No. 23153522.0, dated Jun. 14, 2023 (12 pages).

First Indian Exam Report on IN Patent Application No. 202027023856 dated May 11, 2022 (6 pages).

First Office Action for CN Appl. No. 201711148126.3, dated Jul. 21, 2023 (with English translation, 35 pages).

First Office Action for JP Appl. No. 2020-527820, dated May 25, 2022 (8 pages, with English translation).

Fujitsu: "Discussion on the CORESET for RMSI delivery" 3GPP TSG RAN WG1 NR Ad-Hoc #2; R1-1710233; Jun. 30, 2017; Qingdao, P.R. (4 pages).

Guangdong Oppo Mobile Telecom: "Discussion on the numerology of RMSI" 3GPP TSG RAN WG1 Meeting #90; R1-1713290; Aug. 25, 2017; Prague, Czech Republic (2 pages).

Guangdong Oppo Mobile Telecom: "Discussion on the RMSI delivery" 3GPP TSG RAN WG1 Meeting NR#3; R1-1715699; Sep. 21, 2017; Nagoya, Japan (2 pages).

Huawei et al., "Overview of bandwidth part", 3GPP TSG RAN WG1 Meeting #90, R1-1712153, Aug. 25, 2017, Prague, Czech Republic (8 pages).

(56) References Cited

OTHER PUBLICATIONS

Huawei et al.: "Discussion on NR RMSI delivery" 3GPP TSG RAN WG1 NR Ad Hoc Meeting; R1-1709915; Jun. 30, 2017; Qingdao, China (3 pages).
Huawei et al.: "NR RMSI delivery" 3GPP TSG RAN WG1 Meeting #90; R1-1712147; Aug. 25, 2017; Prague, Czech Republic (4 pages).
Huawei et al.: "RMSI delivery" 3GPP TSG RAN WG1 Meeting 90bis; R1-1717050; Oct. 13, 2017; Prague, Czech Republic (6 pages).
Huawei et al.: "RMSI delivery" 3GPP TSG RAN WG1 Meeting NR#3; R1-1715388; Sep. 21, 2017; Nagoya, Japan (5 pages).
Intel Corporation: "Remaining system information delivery mechanisms" 3GPP TSG RAN WG1 Meeting Ad-hoc#2; R1-1710508; Jun. 30, 2017; Qingdao, P.R. China (4 pages).
Intel Corporation: "RMSI Contents and Delivery Mechanism" 3GPP TSG RAN WG1 Meeting 90bis; R1-1717355; Oct. 13, 2017; Prague, Czech Republic (4 pages).
Intel Corporation: RMSI Contents and Delivery Mechanism; 3GPP TSG RAN WG1 Meeting NR Ad-hoc #3; R1-1716278; Sep. 21, 2017; Nagoya, Japan (6 pages).
International Search Report on PCT Application No. PCT/CN2018/116114 mailed on Feb. 21, 2019 (5 pages).
Lenovo et al.: "Discussion on RMSI delivery" 3GPP TSG RAN WG1 Meeting #90; R1-1712684; Aug. 25, 2017; Prague, P.R. China (3 pages).
Lenovo et al.: "Discussion on RMSI delivery" 3GPP TSG RAN WG1 Meeting 90bis; R1-1717862; Oct. 13, 2017; Prague, CZ (4 pages).
Lenovo et al.: "Discussion on RMSI delivery" 3GPP TSG RAN WG1 Meeting NR#3; R1-1715536; Sep. 21, 2017; Nagoya, Japan (5 pages).
LG Electronics, "Discussion on CORESET configuration" 3GPP TSG RAN WG1 Meeting #90, R1-1713166, Aug. 21, 2017, Prague, Czech Republic (7 pages).
LG Electronics, "RMSI delivery and CORESET configuration", 3GPP TSG RAN WG1 Meeting #90, R1-1713125, Aug. 25, 2017, Prague, Czech Republic (8 pages).
LG Electronics: "Discussion on CORESET configuration" 3GPP TSG RAN WG1 Meeting #90; R1-1713166; Aug. 25, 2017; Prague, Czech Republic (7 pages).
LG Electronics: "RMSI delivery and CORESET configuration" 3GPP TSG RAN WG1 Meeting 90bis; R1-1717927; Oct. 2017; Prague, CZ (6 pages).
LG Electronics: "RMSI delivery and CORESET configuration" 3GPP TSG RAN WG1 Meeting NR#3; R1-1715842; Sep. 21, 2017; Nagoya, Japan (7 pages).
Mediatek Inc.: "Discussion on RMSI transmission" 3GPP TSG RAN WG1 Meeting NR#3; R1-1716205; Sep. 21, 2017; Nagoya, Japan (2 pages).
Mediatek Inc.: "Further discussion on RMSI transmission" 3GPP TSG RAN WG1 Meeting 90bis; R1-1718330; Oct. 13, 2017; Prague, CZ (3 pages).
NEC: "PRB indexing for RMSI in NR" 3GPP TSG-RAN WG1 NR Ad-Hoc#2; R1-1710244; Jun. 30, 2017; Qingdao, P.R. China (5 pages).
Nokia et al., "Remaining Details on Remaining Minimum System Information Delivery", 3GPP TSG-RAN WG1 NR #91, R1-1720881, Dec. 1, 2017, Reno, Nevada (8 pages).
Non-Final Office Action on U.S. Appl. No. 16/875,701 Dtd Dec. 23, 2021.
Non-Final Office Action on U.S. Appl. No. 17/989,208 Dtd Mar. 16, 2023.
Notice of Allowance on KR Appl. No. 10-2020-7017555, dated Jul. 24, 2023 (8 pages, with English translation).
Notice of Allowance on U.S. Appl. No. 16/875,701 Dtd Apr. 18, 2022.
Notice of Allowance on U.S. Appl. No. 17/989,208 Dtd Aug. 21, 2023.
NTT Docomo, Inc., "Discussion on remaining details on RMSI delivery", 3GPP TSG RAN WG1 Meeting 90bis, R1-1718181, Prague, Oct. 13, 2017 (7 pages).
NTT Docomo, Inc: "Discussion on remaining details on RMSI delivery" #GPP TSG RAN WG1 Meeting NR#3; R1-1716071; Sep. 21, 2017; Nagoya, Japan (5 pages).
Office Action for KR Appl. No. 10-2023-7030403, dated Oct. 26, 2023 (with English translation, 6 pages).
Oppo: "Discussion on the RMSI delivery" 3GPP TSG RAN WG1 Meeting 90bis; R1-1718777; Oct. 13, 2017; Prague, CZ (2 pages).
Quangdong Oppo Mobile Telecom: "Discussion on the numerology of RMSI" 3GPP TSG RAN WG1 NR Ad-Hoc #2; R1-1710134; Jun. 30, 2017; Qingdao, P.R. China (2 pages).
Search Report and Written Opinion for SG appl. No. 11202004533T, dated Feb. 18, 2022 (7 pages).
Second Office Action for JP Appl. No. 2020-527820, dated Nov. 29, 2022 (with English translation, 4 pages).
US Notice of Allowance on US Dtd Aug. 10, 2022.
Xiaomi Technology: "Optimization on the SSB Bitmap in Group indication in RMSI" 3GPP TSG RAN WG1 Meeting 90bis; R1-1718458; Oct. 13, 2017; Prague, CZ (2 pages).
Xinwei: "Discussion on RMSI delivery" 3GPP TSG RAN WG1 Meeting #90; R1-1712273; Aug. 25, 2017; Prague, Czech Republic (4 pages).
ZTE Corporation, "RMSI delivery", R1-1712061, 3GPP TSG RAN WG1 Meeting #90, Prague, Czechia, Aug. 21-25, 2017 (11 pages).
ZTE et al., "Remaining details of NR-PBCH design", 3GPP TSG RAN WG1 Meeting #90bis, R1-1717031, Oct. 13, 2017, Prague, Czech Republic (8 pages).
ZTE et al., "Remaining details of RMSI", 3GPP TSG RAN WG1 Meeting #90bis, R1-1717032, Oct. 13, 2017, Prague, Czech Republic (12 pages).
ZTE et el.: "Remaining details of RMSI" 3GPP TSG RAN WG1 Meeting NR#3; R1-1715378; Sep. 21, 2017; Nagoya, Japan (12 pages).
ZTE etc., "Remaining details of RMSI", 3GPP TSG RAN WG1 Meeting #91, R1-1719342 , Reno, Dec. 1, 2017 (22 pages).
ZTE: "RMSI delivery" 3GPP TSG RAN WG1 NR Ad-Hoc #2; R1-1709891; Jun. 30, 2017; Qingdao, China (7 pages).
Ericsson, "On Configuration of Control Resource Sets and Search Space", 3GPP TSG RAN1 WG1 Meeting #90bis, R1-1718628, Oct. 13, 2017, Prague, Czech Republic (9 pages).
Huawei et al., "CORESET configuration and search space design", 3GPP TSG RAN WG1 Meeting #90bis, R1-1717062, Oct. 13, 2017, Prague, Czech Republic (15 pages).
Notice of Grounds of Rejection for JP Appl. No. 2023-117528, dated Jul. 9, 2024 (with English translation, 11 pages).

\* cited by examiner (1)

(2)

(3)

(4)

(5)

(6)

(7)

(8)

INFORMATION SENDING METHOD AND DEVICE AND INFORMATION RECEIVING METHOD AND DEVICE

CROSS REFERENCE TO RELATED APPLICATIONS

The present application is a continuation of U.S. Ser. No. 17/989,208, filed Nov. 17, 2022 which is a continuation of U.S. Ser. No. 16/875,701, filed May 15, 2020 which is a continuation of PCT/CN2018/116114, filed Nov. 19, 2018 which claims the priority of Chinese Patent Application No. 201711148126.3, filed in the Chinese Patent Office on Nov. 17, 2017, the entire contents of which are herein incorporated by reference.

TECHNICAL FIELD

The present application relates to the field of communications, for example, information transmission and reception methods and apparatuses.

BACKGROUND

In a new generation of a radio communication system (New Radio, NR), system information is divided into minimum system information (minimum SI) and other system information (other SI). The minimum system information is divided into "master system information (Mater Information Block, MIB)" carried on a physical broadcast channel (Physical Broadcast Channel, PBCH), and "remaining minimum system information (remaining minimum SI, RMSI)" carried on a physical downlink shared channel; and the master system information is used to provide basic system parameters of a cell, and the remaining minimum system information is used to provide configuration information related to initial access, such as transmission configuration of an initial access request, and message reception configuration of an initial access response. Other system information that needs to be broadcast is referred to as other system information.

The RMSI is scheduled by a physical downlink control channel (Physical Downlink Control Channel, PDCCH), and carried on the physical downlink shared channel (Physical Downlink Shared Channel, PDSCH). Time and frequency domain positions of a common control-resource set (control-resource set, CORESET) where RMSI scheduling information is located may be indicated in the PBCH.

In the NR system, the PBCH is carried in a synchronization signal (Synchronization Signal, SS)/physical broadcast channel block (PBCH block) and transmitted, one synchronization period includes a plurality of SS/PBCH blocks, and different SS/PBCH blocks may transmit synchronous broadcast signals of the same or different beam directions or ports together to implement full coverage of an expected region. PBCHs of different beam directions and ports have a need for combined reception; therefore, it is necessary to ensure that information contents are the same in considering an introduction of indication information into the PBCHs.

To ensure flexibility of data transmission, relationships between time domain positions of different SS/PBCH blocks and time domain positions of respectively corresponding RMSI common control resource sets may be different, and there is no effective solution in the related art for how to effectively indicate a time domain position of an RMSI common control resource set without affecting combined reception of PBCHs.

SUMMARY

Embodiments of the present application provide information transmission and reception methods and apparatuses to at least solve a technical problem in the related art that time and frequency domain resource positions of a control resource set cannot be effectively indicated without affecting combined reception of PBCHs.

According to an embodiment of the present application, provided is an information transmission method, including: carrying configuration information of a control resource set on a physical broadcast channel; where the configuration information is used to indicate to a terminal at least one of the following of the control resource set: time domain position information and frequency domain position information; and transmitting the control resource set to the terminal according to the configuration information.

According to an embodiment of the present application, provided is another information reception method, including: receiving configuration information of a control resource set, where the configuration information of the control resource set is carried on a physical broadcast channel, and the configuration information is used to indicate at least one of the following of the control resource set: time domain position information and frequency domain position information; and receiving the control resource set according to the configuration information.

According to another embodiment of the present application, provided is an information transmission apparatus, including: a configuration module configured to carry configuration information of a control resource set on a physical broadcast channel; where the configuration information is used to indicate to a terminal at least one of the following of the control resource set: time domain position information and frequency domain position information; and a transmitting module configured to transmit the control resource set according to the configuration information.

According another embodiment of the present application, provided is another information reception apparatus, including: a first receiving module configured to receive configuration information of a control resource set, where the configuration information of the control resource set is carried on a physical broadcast channel, and the configuration information is used to indicate at least one of the following of the control resource set: time domain position information and frequency domain position information; and a second receiving module configured to receive the control resource set according to the configuration information.

According to a further embodiment of the present application, further provided is a storage medium, including a stored program, where the method according to any one of the foregoing is executed when the program is run.

According to a further embodiment of the present application, further provided is a processor, configured to run a program, where the method according to any one of the foregoing is executed when the program is run.

BRIEF DESCRIPTION OF DRAWINGS

The drawings described herein are used to provide a further understanding of the present application and form a part of the present application; and the illustrative embodiments of the present application and the description thereof are used to explain the present application and are not intended to limit the present application. In the drawings.

DESCRIPTION OF EMBODIMENTS

The present application will be illustrated in detail below with reference to the drawings in conjunction with embodiments. It should be noted that, the embodiments of the present application and features in the embodiments may be mutually combined provided that no conflict is caused.

It should be noted that, the terms "first", "second", and the like in the specification, claims, and accompanying drawings of the present application are intended to distinguish between similar objects but do not necessarily indicate a specific order or sequence.

Embodiment 1

In the embodiment of the present application, a network architecture that can be run includes: a base station and a terminal, where an information exchange is performed between the base station and the terminal.

Figure 1:
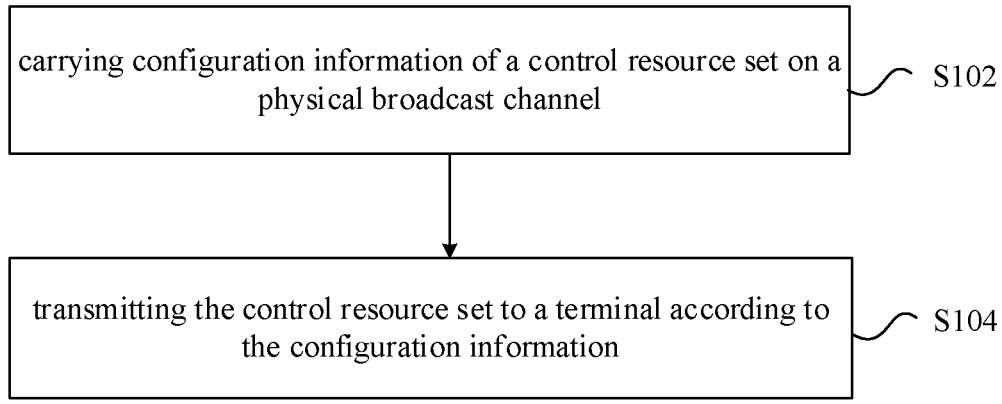
FIG. 1 is a flowchart of an information transmission method according to an embodiment of the present application.

An information transmission method applied to the foregoing network architecture is provided in the present embodiment. FIG. 1 is a flowchart of an information transmission method according to an embodiment of the present application, and as shown in FIG. 1, the flow includes: a step S102 and a step S104. In the step S102, configuration information of a control resource set is carried on a physical broadcast channel.

The configuration information is used to indicate to a terminal at least one of the following of the control resource set: time domain position information and frequency domain position information.

In the step S104, the control resource set is transmitted to the terminal according to the configuration information.

Through the foregoing steps, by carrying configuration information of a control resource set on a physical broadcast channel and transmitting the control resource set to a terminal according to the configuration information, a technical problem in the related art that time and frequency domain resource positions of a control resource set cannot be effectively indicated without affecting combined reception of PBCHs is solved, and flexibility of data transmission is improved.

In an embodiment, an execution body of the foregoing steps may be at a network side, such as a base station, but it is not limited hereto.

In an embodiment, the configuration information of the control resource set includes: bandwidth information of the control resource set.

In an embodiment, the bandwidth information includes at least one of the following: a minimum channel bandwidth and a minimum terminal bandwidth.

In an embodiment, the configuration information of the control resource set includes the frequency domain position information of the control resource set, where the frequency domain position information is indicated by a frequency offset between the control resource set and a synchronization signal block.

In an embodiment, the frequency domain position information of the control resource set is indicated by one of the following:
- an offset between a center frequency of the control resource set and a center frequency of the synchronization signal block being $M \times SC_{SSB}$;
- an offset between a center frequency of the control resource set and a center frequency of the synchronization signal block being $(BW_{CORESET} - BW_{SSB})/2 - M \times SC_{SSB}$;
- an offset between a center frequency of the control resource set and a center frequency of the synchronization signal block being $(BW_{CORESET} - BW_{SSB})/2 - (12 \times SC_{CORESET} - M \times SC_{SSB})$;
- an offset between a center frequency of the control resource set and a center frequency of the synchronization signal block being $(BW_{CORESET} + BW_{SSB})/2 + M \times SC_{SSB}$; and
- an offset between a center frequency of the control resource set and a center frequency of the synchronization signal block being $(BW_{CORESET} + BW_{SSB})/2 + (12 \times SC_{CORESET} + M \times SC_{SSB})$;

where M is a number of synchronization signal block subcarriers in a frequency domain offset between the synchronization signal block and a carrier physical resource block grid (PRB grid), M is an integer, $SC_{CORESET}$ is a frequency domain width of a control resource set subcarrier, $SC_{SSB}$ is a frequency domain width of a synchronization signal block subcarrier, $BW_{CORESET}$ is a control resource set bandwidth, and $BW_{SSB}$ is a synchronization signal block bandwidth.

In an embodiment, the configuration information of the control resource set includes the time domain position information of the control resource set; where the time domain position information includes at least one of the following information: information of a slot in which the control resource set is located and position information of a symbol occupied by the control resource set in the slot.

In an embodiment, the position information of the symbol occupied by the control resource set in the slot includes: a starting symbol index of the symbol occupied by the control resource set in the slot and a number of symbols occupied by the control resource set in the slot.

In an embodiment, the information of the slot in which the control resource set is located includes one of the following:
- the control resource set is transmitted in a slot containing a synchronization signal block;
- the control resource set is transmitted in a slot not containing a synchronization signal block; and
- the control resource set is transmitted in a slot containing a synchronization signal block and transmitted in a slot not containing the synchronization signal block.

In an embodiment, the configuration information of the control resource set is further used to indicate: whether the control resource set is transmitted in the slot containing a synchronization signal block; or whether the control resource set is transmitted in the slot not containing a synchronization signal block.

In an embodiment, when the control resource set is transmitted in the slot containing a synchronization signal block and transmitted in the slot not containing the synchronization signal block, a same resource mapping rule is adopted for the control resource set in the slot containing a synchronization signal block and in the slot not containing the synchronization signal block.

In an embodiment, the configuration information of the control resource set includes monitoring window configuration information of the control resource set, where the monitoring window configuration information of the control resource set includes at least one of the following information: a monitoring period of the control resource set, time domain duration of a monitoring window, a time domain offset between adjacent monitoring windows, and a starting position of the monitoring window, where a monitoring window of the control resource set includes at least one monitoring occasion of the control resource set.

In an embodiment, the monitoring window of the control resource set corresponds to a synchronization signal block.

In an embodiment, the time domain duration of the monitoring window of the control resource set is greater than or equal to 1 slot.

In an embodiment, the time domain offset between the adjacent monitoring windows includes at least one of the following: 0, the time domain duration of the monitoring window, and 1/X of the time domain duration of the monitoring window, where X is an integer greater than 1, and a value of X is predefined by a predetermined protocol or indicated by a signaling.

In an embodiment, when the time domain duration of the monitoring window of the control resource set is 1 slot, the time domain offset between the adjacent monitoring windows is the time domain duration of the monitoring window, or 1/X of the time domain duration of the monitoring window; and when the time domain duration of the monitoring window of the control resource set is greater than 1 slot, the time domain offset between the adjacent monitoring windows is 0, or 1/X of the time domain duration of the monitoring window.

In an embodiment, the starting position of the monitoring window is indicated by a time domain offset between the starting position of the monitoring window and a starting slot of a synchronization signal block, or the starting position of the monitoring window is fixedly configured.

In an embodiment, the control resource set is one of the following: a common control resource set of remaining minimum system information RMSI and a common control resource set of paging information.

Figure 2:
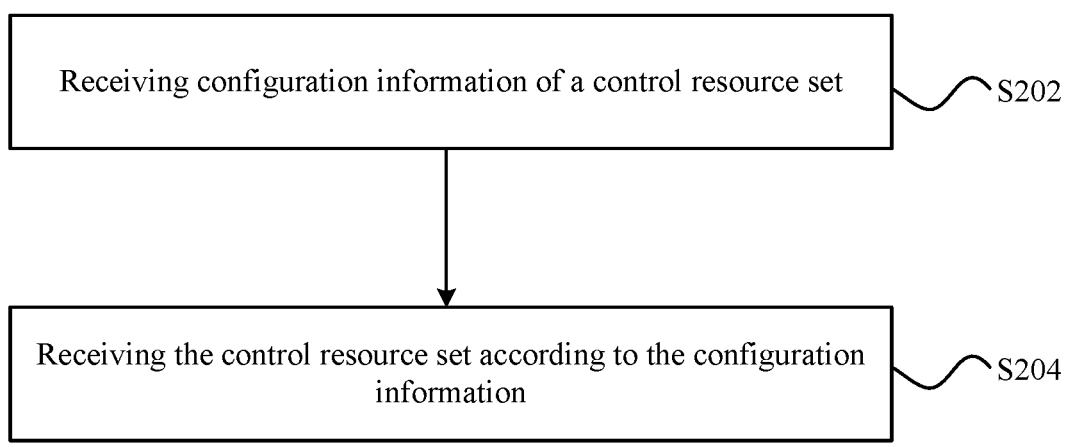
FIG. 2 is a flowchart of an information reception method according to an embodiment of the present application.

An information reception method applied to the foregoing network architecture is provided in the present embodiment. FIG. 2 is a flowchart of an information reception method according to an embodiment of the present application, and as shown in FIG. 2, the flow includes the following steps: a step S202 and a step S204.

In the step S202, configuration information of a control resource set is received.

The configuration information of the control resource set is carried on a physical broadcast channel, and the configuration information is used to indicate at least one of the following of the control resource set: time domain position information and frequency domain position information.

In the step S204, the control resource set is received according to the configuration information.

In an embodiment, the configuration information of the control resource set includes: bandwidth information of the control resource set.

In an embodiment, the configuration information of the control resource set includes: the frequency domain position information of the control resource set, where the frequency domain position information is indicated by a frequency offset between the control resource set and a synchronization signal block.

In an embodiment, the frequency domain position information of the control resource set is indicated by one of the following:
- an offset between a center frequency of the control resource set and a center frequency of the synchronization signal block being $M \times SC_{SSB}$;
- an offset between a center frequency of the control resource set and a center frequency of the synchronization signal block being $(BW_{CORESET} - BW_{SSB})/2 - M \times SC_{SSB}$;
- an offset between a center frequency of the control resource set and a center frequency of the synchronization signal block being $(BW_{CORESET} - BW_{SSB})/2 - (12 \times SC_{CORESET} - M \times SC_{SSB})$;
- an offset between a center frequency of the control resource set and a center frequency of the synchronization signal block being $(BW_{CORESET} + BW_{SSB})/2 + M \times SC_{SSB}$; and
- an offset between a center frequency of the control resource set and a center frequency of the synchronization signal block being $(BW_{CORESET} + BW_{SSB})/2 + (12 \times SC_{CORESET} + M \times SC_{SSB})$;

where M is a number of synchronization signal block subcarriers in a frequency domain offset between the synchronization signal block and a carrier physical resource block grid (PRB grid), M is an integer, $SC_{CORESET}$ is a frequency domain width of a control resource set subcarrier, $SC_{SSB}$ is a frequency domain width of a synchronization signal block subcarrier, $BW_{CORESET}$ is the control resource set bandwidth, and $BW_{SSB}$ is the synchronization signal block bandwidth.

In an embodiment, the configuration information of the control resource set includes the time domain position information of the control resource set; where the time domain position information includes at least one of the following information: information of a slot in which the control resource set is located and position information of a symbol occupied by the control resource set in the slot.

In an embodiment, the configuration information of the control resource set includes monitoring window configuration information of the control resource set, where the monitoring window configuration information of the control resource set includes at least one of the following information: a monitoring period of the control resource set, time domain duration of a monitoring window, a time domain offset between adjacent monitoring windows, and a starting position of the monitoring window, where a monitoring window of the control resource set includes at least one monitoring occasion of the control resource set.

From the description of the foregoing implementation manners, those skilled in the art would clearly understand that the present application can be implemented by software together with the necessary general-purpose hardware according to the methods of the foregoing embodiments, and certainly can also be achieved only by hardware, but the former would be preferred. Based on such understanding, the technical solutions of the present application substantially, or the part of the present application making contribution to the prior art may be embodied in the form of a software product, and the computer software product is stored in a storage medium (such as a ROM/RAM, a magnetic disk, or an optical disk), which includes multiple instructions enabling terminal equipment (which may be a cell phone, a computer, a server, network equipment or the like) to execute the methods described in the embodiments of the present application.

Embodiment 2

In the present embodiment, further provided are information transmission and reception apparatuses, and the apparatuses are configured to implement the foregoing embodiment and preferred implementation manners, and what has been illustrated will not be repeated redundantly. As used hereinafter, the term "module" may implement at least one of software and hardware for a predetermined function. Although the apparatuses described in the following embodiment is preferably implemented by software, the implementation of hardware or a combination of software and hardware is also possible and conceivable.

Figure 3:
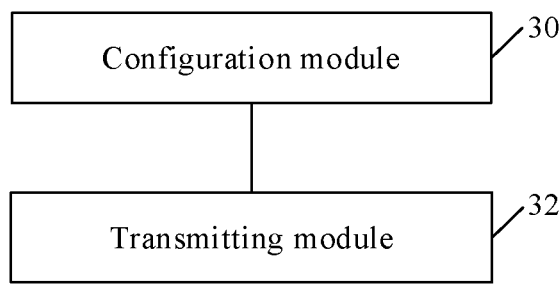
FIG. 3 is a structural block diagram of an information transmission apparatus according to an embodiment of the present application.

FIG. 3 is a structural block diagram of an information transmission apparatus according to an embodiment of the present application, and it may be applied to a network element at a network side, such as a base station; and as shown in FIG. 3, the apparatus includes: a configuration module 30 and a transmitting module 32.

The configuration module 30 is configured to carry configuration information of a control resource set on a physical broadcast channel; where the configuration information is used to indicate to a terminal at least one of the following of the control resource set: time domain position information and frequency domain position information.

The transmitting module 32 is configured to transmit the control resource set according to the configuration information.

Figure 4:
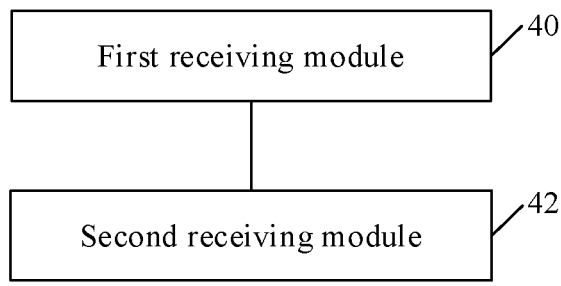
FIG. 4 is a structural block diagram of an information reception apparatus according to an embodiment of the present application.

FIG. 4 is a structural block diagram of an information reception apparatus according to an embodiment of the present application, and it may be applied to a terminal; and as shown in FIG. 4, the apparatus includes: a first receiving module 40 and a second receiving module 42.

The first receiving module 40 is configured to receive configuration information of a control resource set, where the configuration information of the control resource set is carried on a physical broadcast channel, and the configuration information is used to indicate at least one of the following of the control resource set: time domain position information and frequency domain position information.

The second receiving module 42 is configured to receive the control resource set according to the configuration information.

It should be noted that, each of the foregoing modules may be implemented by software or hardware; and for the latter, it may be implemented by the following manner, but is not limited hereto: the foregoing modules are located in a same processor; or each of the foregoing modules is respectively located in different processors in any combination.

Embodiment 3

To ensure flexibility of data transmission, relationships between time domain positions of different SS/PBCH blocks and time domain positions of respectively corresponding RMSI common control resource sets may be different, and how to effectively indicate a time domain position of an RMSI common control resource set without affecting combined reception of PBCHs is a problem that must be considered and solved.

In a new generation of a radio communication system NR, system information is divided into minimum system information (minimum SI) and other system information (other SI). The minimum system information is further divided into "master system information (MIB)" carried on a physical broadcast channel (PBCH), and "remaining minimum system information" carried on a physical downlink shared channel; and the master system information is used to provide basic system parameters of a cell, and the remaining minimum system information is used to provide configuration information related to initial access, such as transmission configuration of an initial access request, and message reception configuration of an initial access response. Other system information that needs to be broadcast is referred to as other system information.

The RMSI is scheduled by a physical downlink control channel PDCCH, and carried on the physical downlink shared channel PDSCH. Time and frequency domain positions of a common control resource set CORESET where RMSI scheduling information is located may be indicated in the PBCH.

In the NR system, the PBCH is carried in a synchronization signal/physical broadcast channel block (SS/PBCH block) and transmitted, one synchronization period includes a plurality of SS/PBCH blocks, and different SS/PBCH blocks may transmit synchronous broadcast signals of the same or different beam directions or ports together to implement full coverage of an expected region. PBCHs of different beam directions and ports have a need for combined reception; therefore, it is necessary to ensure that information contents are the same in considering an introduction of indication information into the PBCHs.

To ensure flexibility of data transmission, relationships between time domain positions of different SS/PBCH blocks and time domain positions of respectively corresponding RMSI common control resource sets may be different, and how to effectively indicate a time domain position of an RMSI common control resource set without affecting combined reception of PBCHs is a problem that must be considered and solved.

The present application provides an information transmission method and system, including the following manners:
carrying, at a network side, configuration information of a control resource set (Control Resource Set, CORESET) on a physical broadcast channel; where the configuration information of the control resource set is used to indicate time and frequency domain position information of the control resource set to a terminal; and
transmitting, at the network side, the control resource set CORESET according to the configuration information.

The configuration information of the control resource set includes one or more of the following:
bandwidth information of the control resource set;
the frequency domain position information of the control resource set;
the time domain position information of the control resource set; where the time domain position information includes at least one of the following information: information of a slot in which the control resource set is located and position information of a symbol occupied by the control resource set in the slot. The position information of the symbol occupied by the control resource set in the slot includes: a starting symbol index of the symbol occupied by the control resource set in the slot and a number of symbols occupied by the control resource set in the slot; and
monitoring window configuration information of the control resource set; where the monitoring window configuration information of the control resource set includes at least one of the following information: a monitoring period of the control resource set, time domain duration of a monitoring window, a time domain offset between adjacent monitoring windows, and a starting position of the monitoring window.

A common control resource set CORESET of the present embodiment may include one or more of the following downlink control information: paging downlink control information, scheduling information of remaining minimum system information, a paging indicator, and the like. Since the information needs to implement full coverage of an expected range, common control information of a certain specific downlink port/downlink beam direction is transmitted in a certain CORESET; and one or more CORESETs are included in one sweeping transmission period/CORESET monitoring period, and the transmission of common control information of one or more downlink ports/downlink beam directions implements the coverage of the expected range.

The paging downlink control information (paging DCI) is used to indicate scheduling information of a paging message, and also referred to as paging scheduling downlink control information (paging scheduling DCI).

In a new generation of a radio communication system NR, system information is divided into minimum system information (minimum SI) and other system information (other SI). The minimum system information is further divided into "master system information (MIB)" carried on a physical broadcast channel (PBCH), and "remaining minimum system information" carried on a physical downlink shared channel; and the master system information is used to provide basic system parameters of a cell, and the remaining minimum system information is used to provide configuration information related to initial access, such as transmission configuration of an initial access request, and message reception configuration of an initial access response. Other system information that needs to be broadcast is referred to as other system information (other SI).

The RMSI is scheduled by a physical downlink control channel PDCCH, and carried on the physical downlink shared channel PDSCH. Time and frequency domain positions of a common control resource set CORESET where RMSI scheduling information is located may be indicated in the PBCH.

The paging indicator is used to trigger a terminal to report a downlink preferred beam, and is also referred to as paging group indicator.

Figure 5:
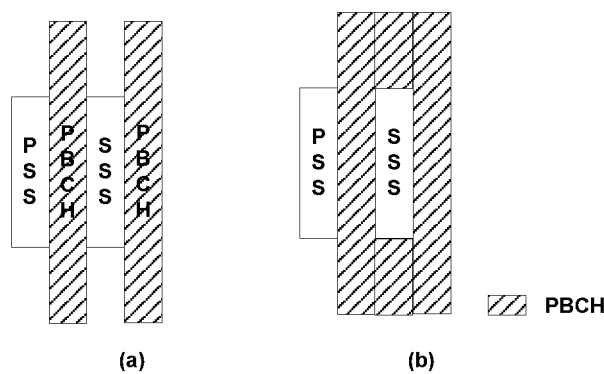
FIG. 5 is a schematic diagram of a synchronization signal block according to the present embodiment.

A synchronization signal block (SS/PBCH block) is times and frequencies domain resources used to carry accessing related signal channels, such as a synchronization signal and a physical broadcast channel (and a corresponding demodulation reference signal DMRS). FIG. 5 is a schematic diagram of a synchronization signal block according the present embodiment; and as shown in FIG. 5, the synchronization signal block usually includes 4 symbols, the first and third symbols carry a primary synchronization signal (PSS) and a secondary synchronization signal (SSS), respectively, and synchronization signal sequences are mapped to 127 resource elements (RE) in 12 physical resource blocks (PRB). As shown in (a) of FIG. 5, in some configurations, physical broadcast channels (PBCHs) are only carried on the second and fourth symbols in the synchronization signal block, and occupy 24 PRBs; or in other resource configurations, PBCHs are mapped to the second, third and fourth symbols in the synchronization signal block, and on the plurality of symbols, the numbers of occupied PRBs are as follows: 20 PRBs are occupied on the second and fourth symbols, and on the third symbol, a PBCH occupies 4 PRBs respectively on two sides of the secondary synchronization signal, a total of 8 PRBs. In the foregoing configurations, center frequencies of the synchronization signals are aligned with center frequencies of the PBCHs.

The present embodiment further includes the following implementation manners.

Implementation Manner 1:

The present implementation manner describes an indication of bandwidth information of the CORESET, which is particularly described as follows: the configuration information of the control resource set includes that the bandwidth information of the control resource set may be the minimum channel bandwidth or the minimum terminal bandwidth.

The minimum channel bandwidth is defined as a minimum bandwidth supported by a system within a certain frequency range; for example, within a frequency range below 6 GHz, the minimum channel bandwidth is defined as 5 MHz; or within a frequency range above 6 GHz, the minimum channel bandwidth is defined as 50 MHz.

The minimum terminal bandwidth refers to a maximum value of bandwidth that are capable of being supported by all terminals.

For the indication of the CORESET bandwidth information, 1 bit (bit) may be included in a physical broadcast channel to indicate whether the CORESET bandwidth of a current carrier is the minimum channel bandwidth or the minimum terminal bandwidth. For example, 0 represents that the CORESET bandwidth of the current carrier is the minimum channel bandwidth, and 1 represents that the CORESET bandwidth of the current carrier is the minimum terminal bandwidth.

Alternatively, the CORESET bandwidth is predefined based on a frequency band; for example, it is specified in a protocol that the CORESET bandwidth of a certain frequency band is equal to the minimum channel bandwidth or the minimum terminal bandwidth. Alternatively, a value of the CORESET bandwidth of a frequency band is given in a protocol, such as 24 PRBs (physical transmission block), or 48 PRBs. In this case, it is unnecessary to introduce a bandwidth indication bit separately.

Alternatively, the CORESET bandwidth is implicitly indicated by a number of symbols occupied by the control resource set in a slot; for example, the number of symbols occupied by the CORESET in a slot is 1, which corresponds to that the CORESET bandwidth is 48 PRBs; and when the number of symbols occupied by the CORESET in the slot is 2, and the CORESET bandwidth is 24 PRBs. In this case, it is unnecessary to introduce a bandwidth indication bit separately.

Implementation Manner 2:

The present implementation manner describes an indication of CORESET frequency domain position information, which is described as follows: the configuration information of the control resource set includes the frequency domain position information of the control resource set; where the frequency domain position is indicated by a frequency offset between the control resource set and a synchronization signal block.

Figure 6:
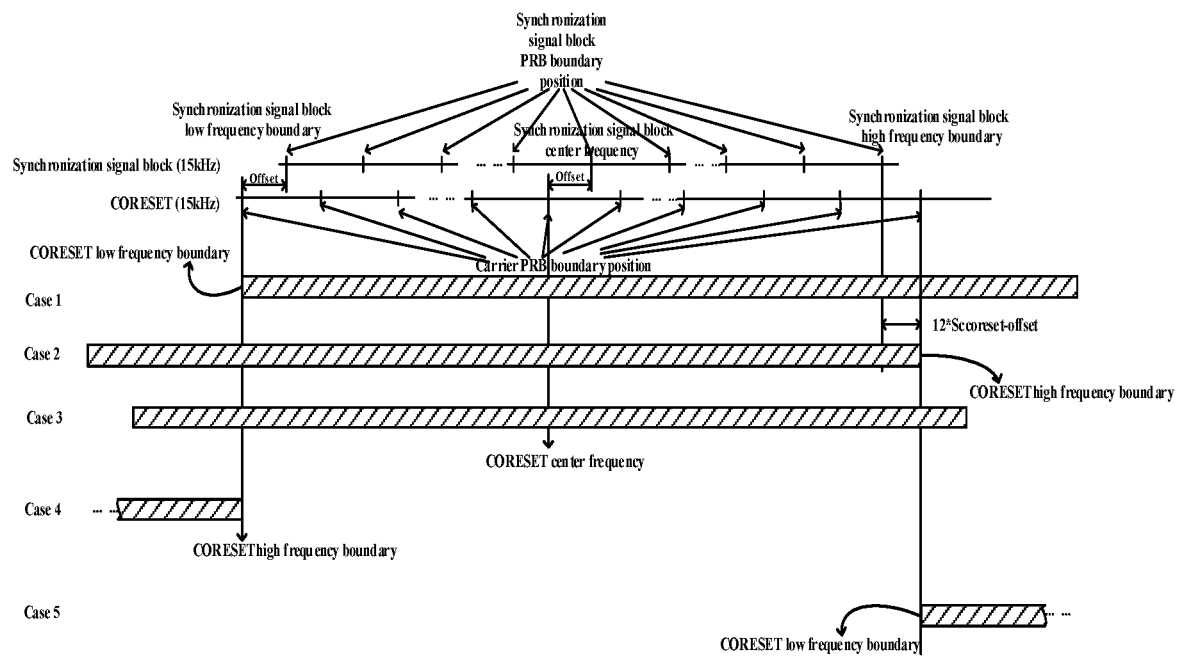
FIG. 6 is a schematic diagram I that a frequency domain position is indicated by a frequency offset between a control resource set and a synchronization signal block according to the present embodiment.
Figure 7:
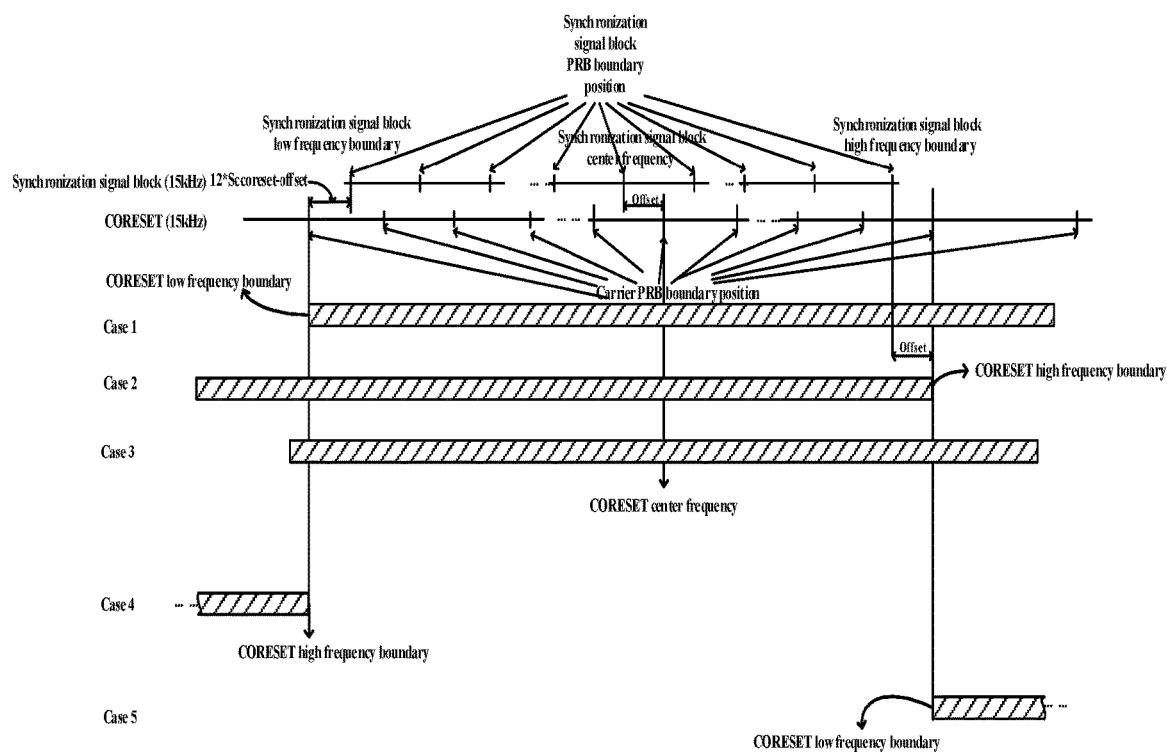
FIG. 7 is a schematic diagram II that a frequency domain position is indicated by a frequency offset between a control resource set and a synchronization signal block according to the present embodiment.
Figure 8:
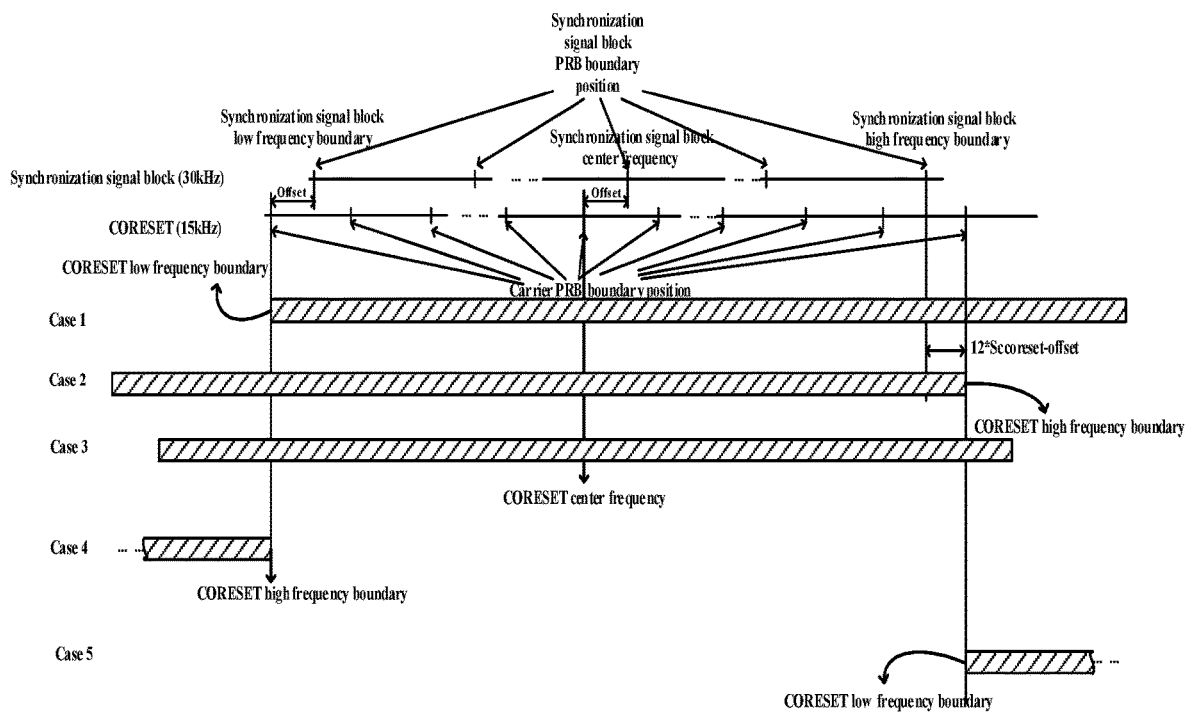
FIG. 8 is a schematic diagram III that a frequency domain position is indicated by a frequency offset between a control resource set and a synchronization signal block according to the present embodiment.
Figure 9:
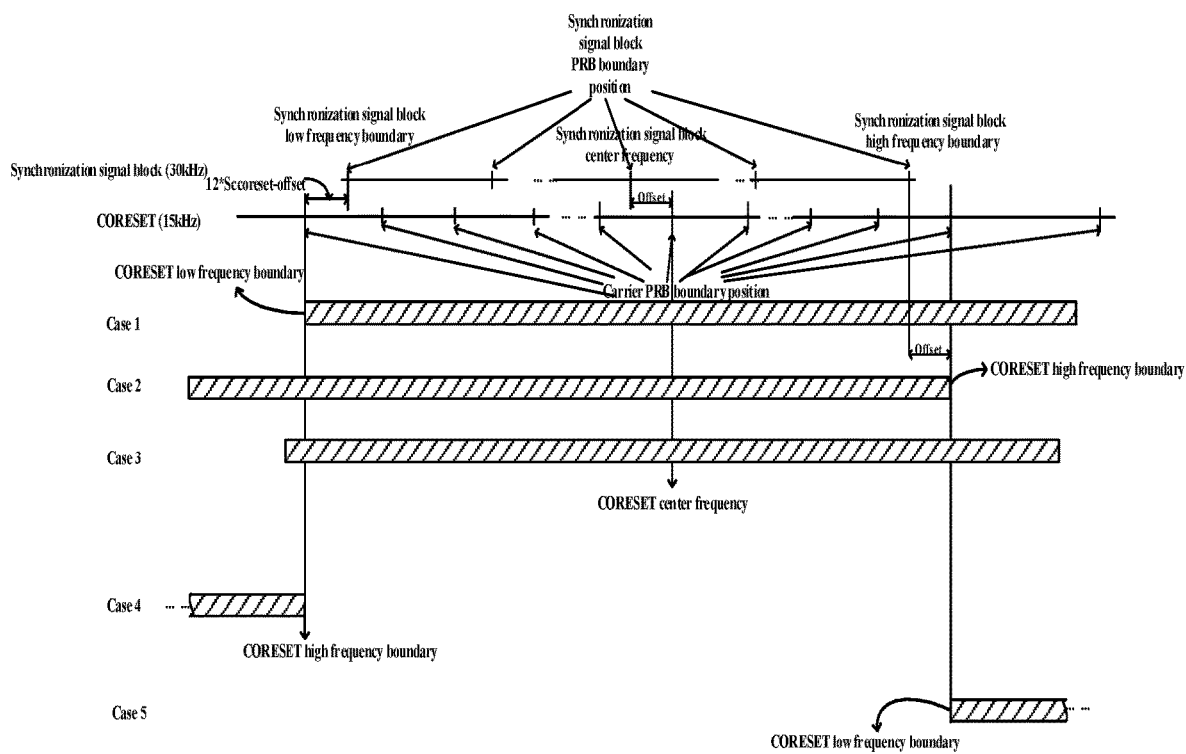
FIG. 9 is a schematic diagram IV that a frequency domain position is indicated by a frequency offset between a control resource set and a synchronization signal block according to the present embodiment.
Figure 10:
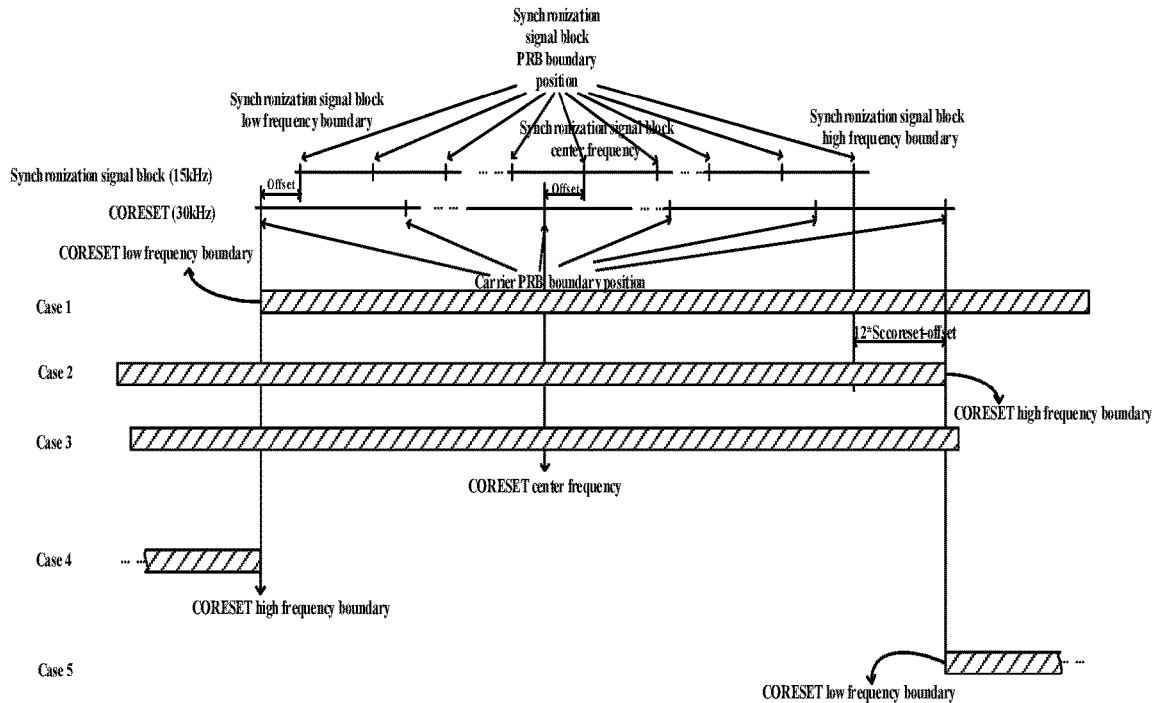
FIG. 10 is a schematic diagram V that a frequency domain position is indicated by a frequency offset between a control resource set and a synchronization signal block according to the present embodiment.
Figure 11:
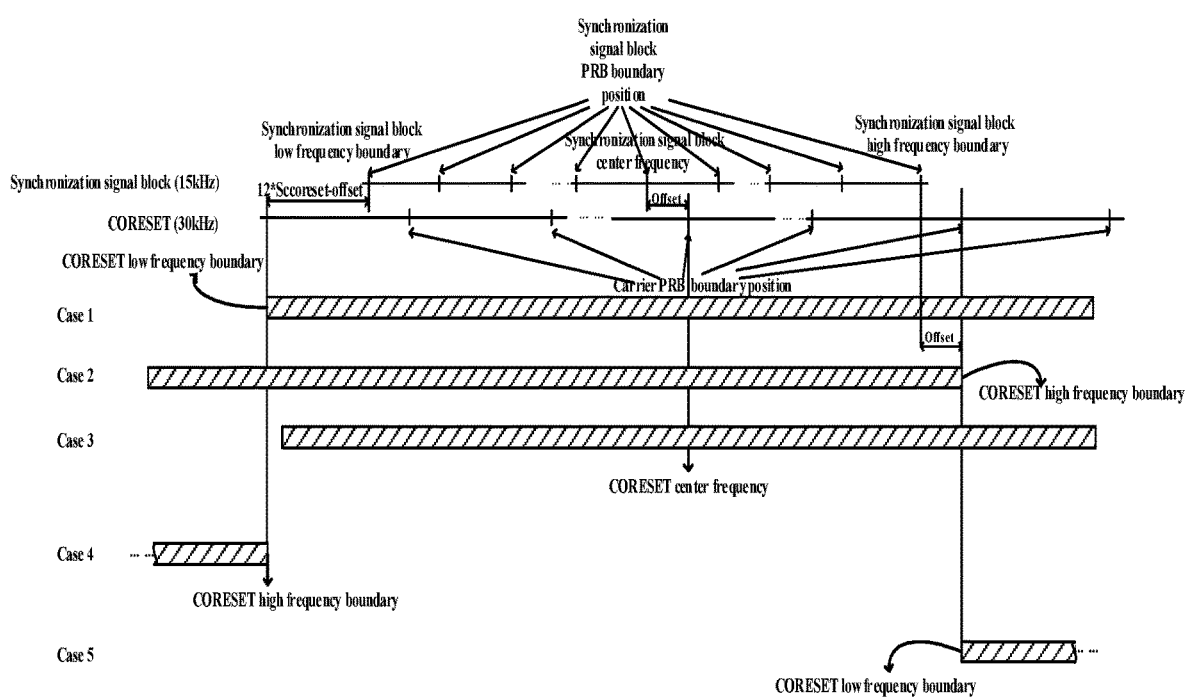
FIG. 11 is a schematic diagram VI that a frequency domain position is indicated by a frequency offset between a control resource set and a synchronization signal block according to the present embodiment.

FIG. 6 is a schematic diagram I that a frequency domain position is indicated by a frequency offset between the control resource set and a synchronization signal block according to the present embodiment, FIG. 7 is a schematic diagram II that a frequency domain position is indicated by a frequency offset between the control resource set and a synchronization signal block according to the present embodiment, FIG. 8 is a schematic diagram III that a frequency domain position is indicated by a frequency offset between the control resource set and a synchronization signal block according to the present embodiment, FIG. 9 is a schematic diagram IV that a frequency domain position is indicated by a frequency offset between the control resource set and a synchronization signal block according to the present embodiment, FIG. 10 is a schematic diagram V that a frequency domain position is indicated by a frequency offset between the control resource set and a synchronization signal block according to the present embodiment, and FIG. 11 is a schematic diagram VI that a frequency domain position is indicated by a frequency offset between the control resource set and a synchronization signal block according to the present embodiment. As shown in FIGS. 6, 7, 8, 9, 10 and 11, there may be offsets (as illustration of offsets) between physical resource block PRB boundaries of a synchronization signal block and actual PRB boundaries of a carrier (physical resource block grid (PRB grid)). An Information bit (such as 4 bits or 5 bits) may be introduced into a physical broadcast channel to explicitly indicate the foregoing offset, and the offset may be predefined as an offset between a physical resource block PRB boundary of a synchronization signal block and a PRB boundary of a carrier at a lower frequency (as shown in FIGS. 6, 8 and 10), or an offset between a physical resource block PRB boundary of a synchronization signal block and a PRB boundary of a carrier at a higher frequency (as shown in FIGS. 7, 9 and 11); however, there is no offset between transmission of a CORESET and an actual PRB boundary of a carrier; therefore, when the frequency domain position of the CORESET is indicated by using a frequency offset from a synchronization signal block, it is necessary to take this offset into account; and indication manners for the CORESET frequency domain position are described below respectively when subcarrier spacing of the CORESET is equal to, less than or greater than subcarrier spacing of the synchronization signal block.

When the subcarrier spacing of the CORESET is equal to the subcarrier spacing of the synchronization signal block (for example, the subcarrier spacing of the CORESET and the synchronization signal block is 15 kHz), as shown in FIGS. 6 and 7, in a carrier physical resource block grid (PRB grid), one carrier PRB includes 12 synchronization signal block subcarriers in frequency domain; therefore, there are 12 possible offset values, that is, a range of a value of the offset is 0 to 11 subcarriers, and a particular offset number (that is, the value of the offset) is indicated by 4 bits in the PBCH.

As shown in FIGS. 8 and 9, when the subcarrier spacing of the CORESET is less than the subcarrier spacing of the synchronization signal block (for example, the subcarrier spacing of the CORESET is 15 kHz, and the subcarrier spacing of the synchronization signal block is 30 kHz), a carrier physical resource block grid (PRB grid) is defined by the greater subcarrier spacing (30 kHz), and a smaller subcarrier is nested within a greater subcarrier, that is, one 30 kHz subcarrier corresponds to two 15 kHz subcarriers in frequency domain. In this case, in the carrier physical resource block grid (PRB grid), one carrier PRB includes 12 synchronization signal block subcarriers in frequency domain, a range of a value of the offset (offset) is 0 to 11 synchronization signal block (30 kHz) subcarriers, and a particular offset number (that is, the value of the offset) is indicated by 4 bits in the PBCH.

As shown in FIGS. 10 and 11, when the subcarrier spacing of the CORESET is greater than the subcarrier spacing of the synchronization signal block (for example, the subcarrier spacing of the CORESET is 30 kHz, and the subcarrier spacing of the synchronization signal block is 15 kHz), a carrier physical resource block grid (PRB grid) is defined by the greater subcarrier spacing (30 kHz), and a smaller subcarrier is nested within a greater subcarrier, that is, 1 30 kHz subcarrier corresponds to 2 15 kHz subcarriers in frequency domain. In this case, in the carrier physical resource block grid (PRB grid), one carrier PRB includes 24 synchronization signal block subcarriers in frequency domain, a range of a value of the offset (offset) is 0 to 23 synchronization signal block (30 kHz) subcarriers, and a particular offset number (that is, the value of the offset) is indicated by 5 bits in the PBCH.

Sub-Implementation Manner 2.1:

When the offset is defined as an offset between a physical resource block PRB boundary of the synchronization signal block and a PRB boundary of a carrier at a lower frequency (as shown in FIGS. 6, 8 and 10), the frequency domain position of the CORESET is one of case 1 to case 5 of the following frequency domain position.

Case 1: a low frequency boundary of the CORESET is lower than a low frequency boundary of the synchronization signal block by M 15 kHz subcarriers; and in this case, an offset between a center frequency of the CORESET and a center frequency of the synchronization signal block is $(BW_{CORESET}-BW_{SSB})/2-M\times SC_{SSB}$.

Case 2: a high frequency boundary of the CORESET is higher than a high frequency boundary of the synchronization signal block by $12\times SC_{CORESET}-M\times SC_{SSB}$; and in this case, an offset between a center frequency of the CORESET and a center frequency of the synchronization signal block is $(BW_{CORESET}-BW_{SSB})/2-(12\times SC_{CORESET}-M\times SC_{SSB})$.

Case 3: an offset between a center frequency of the CORESET and a center frequency of the synchronization signal block is M 15 kHz subcarriers; that is, an absolute offset between the center frequencies is $M\times SC_{SSB}$.

Case 4: a high frequency boundary of the CORESET is lower than a low frequency boundary of the synchronization signal block by M 15 kHz subcarriers; and in this case, an offset between a center frequency of the CORESET and a center frequency of the synchronization signal block is $(BW_{CORESET}+BW_{SSB})/2+M\times SC_{SSB}$.

Case 5: a low frequency boundary of the CORESET is higher than a high frequency boundary of the synchronization signal block by $12\times SC_{CORESET}-M\times SC_{SSB}$; and in this case, an offset between a center frequency of the CORESET and a center frequency of the synchronization signal block is $(BW_{CORESET}+BW_{SSB})/2+(12\times SC_{CORESET}-M\times SC_{SSB})$;

where M is a number of synchronization signal block subcarriers in a frequency domain offset between the synchronization signal block and a PRB boundary, M is an integer, and when the subcarrier spacing of the CORESET is less than or equal to the subcarrier spacing of the synchronization signal block, a range of the value of the offset is: $0\leq M\leq 11$. When the subcarrier spacing of the CORESET is greater than the subcarrier spacing of the synchronization signal block, the range of the value of the offset is: $0\leq M\leq 23$. $SC_{CORESET}$ is a frequency domain width of a control resource set subcarrier, $SC_{SSB}$ is a frequency domain width of a synchronization signal block subcarrier, $BW_{CORESET}$ is the control resource set bandwidth, and $BW_{SSB}$ is the synchronization signal block bandwidth.

In the foregoing 5 cases, in the cases 1, 2 and 3, the frequency domain range of the CORESET includes the frequency domain range of the synchronization signal block; and in the cases 4 and 5, the frequency domain range of the CORESET does not overlap the frequency domain range of the synchronization signal block.

Sub-Implementation Manner 2.2:

FIGS. 7, 9 and 11 illustrate cases where the offset (offset) is an offset between a physical resource block PRB boundary of the synchronization signal block and a PRB boundary of a carrier at a higher frequency, and there are the following case 1 to case 5 similar to the cases illustrated in FIG. 6.

Case 1: a low frequency boundary of the CORESET is lower than a low frequency boundary of the synchronization signal block by $12\times SC_{CORESET}-M\times SC_{SSB}$; and in this case, an offset between a center frequency of the CORESET and a center frequency of the synchronization signal block is $(BW_{CORESET}-BW_{SSB})/2-(12\times SC_{CORESET}-M\times SC_{SSB})$.

Case 2: a high frequency boundary of the CORESET is higher than a high frequency boundary of the synchronization signal block by $M\times SC_{SSB}$, that is, M synchronization signal block subcarriers; and in this case, an offset between a center frequency of the CORESET and a center frequency of the synchronization signal block is $(BW_{CORESET}-BW_{SSB})/2-M\times SC_{SSB}$.

Case 3: an offset between a center frequency of the CORESET and a center frequency of the synchronization signal block is M 15 kHz subcarriers; that is, an absolute offset between the center frequencies is $M\times SC_{SSB}$.

Case 4: a high frequency boundary of the CORESET is lower than a low frequency boundary of the synchronization signal block by $12\times SC_{CORESET}-M\times SC_{SSB}$; and in this case, an offset between a center frequency of the CORESET and a center frequency of the synchronization signal block is $(BW_{CORESET}+BW_{SSB})/2+(12\times SC_{CORESET}-M\times SC_{SSB})$.

Case 5: a low frequency boundary of the CORESET is higher than a high frequency boundary of the synchronization signal block by $M\times SC_{SSB}$, that is, M synchronization signal block subcarriers; and in this case, an offset between a center frequency of the CORESET and a center frequency of the synchronization signal block is $(BW_{CORESET}+BW_{SSB})/2+M\times SC_{SSB}$.

Where M is a number of synchronization signal block subcarriers in a frequency domain offset between the synchronization signal block and a PRB boundary, M is an integer, and when the subcarrier spacing of the CORESET is less than or equal to the subcarrier spacing of the synchronization signal block, a range of the value of the offset is: $0\leq M\leq 11$. When the subcarrier spacing of the CORESET is greater than the subcarrier spacing of the synchronization signal block, the range of the value of the offset is: $0\leq M\leq 23$. $SC_{CORESET}$ is a frequency domain width of a control resource set subcarrier, $SC_{SSB}$ is a frequency domain width of a synchronization signal block subcarrier, $BW_{CORESET}$ is the control resource set bandwidth, and $BW_{SSB}$ is the synchronization signal block bandwidth.

In the foregoing 5 cases, in the cases 1, 2 and 3, the frequency domain range of the CORESET includes the frequency domain range of the synchronization signal block; and in the cases 4 and 5, the frequency domain range of the CORESET does not overlap with the frequency domain range of the synchronization signal block.

In the CORESET frequency domain positions as above, any one or more optional positions thereof may be specified in the protocol, and an indication bit is introduced into a CORESET configuration information indication field of the PBCH to indicate a frequency domain position of the CORESET of a current carrier to a terminal. For example, it is specified in the protocol that the frequency domain position of the CORESET includes the following 4 cases: case 1, case 2, case 4 and case 5; and 2 bits are used in the PBCH to indicate which configuration of the foregoing 4 frequency domain positions is currently used.

Alternatively, as defined below, in the case 1 and case 2, the CORESET bandwidth overlaps the synchronization signal block bandwidth, and it is more suitable for a case that the subcarrier spacing of both is the same; on the contrary, in the case 4 and case 5, the CORESET bandwidth does not overlap the synchronization signal block bandwidth, and it is more suitable for a case that the subcarrier spacing of both is different. Therefore, it is specified in the protocol that when the subcarrier spacing of the CORESET and the subcarrier spacing of the synchronization signal block are the same, 1 bit is introduced into the PBCH to indicate which configuration of the foregoing frequency domain positions in the case 1 and case 2 is currently used; and when the subcarrier spacing of the CORESET and the subcarrier spacing of the synchronization signal block are different, 1 bit is introduced into the PBCH to indicate which configuration of the foregoing frequency domain positions in the case 4 and case 5 is currently used.

Implementation Manner 3:

The present implementation manner describes indication manners for information of a slot in which a control resource set is located.

There are three following cases for the information of the slot in which the CORESET is located.

Figure 12:
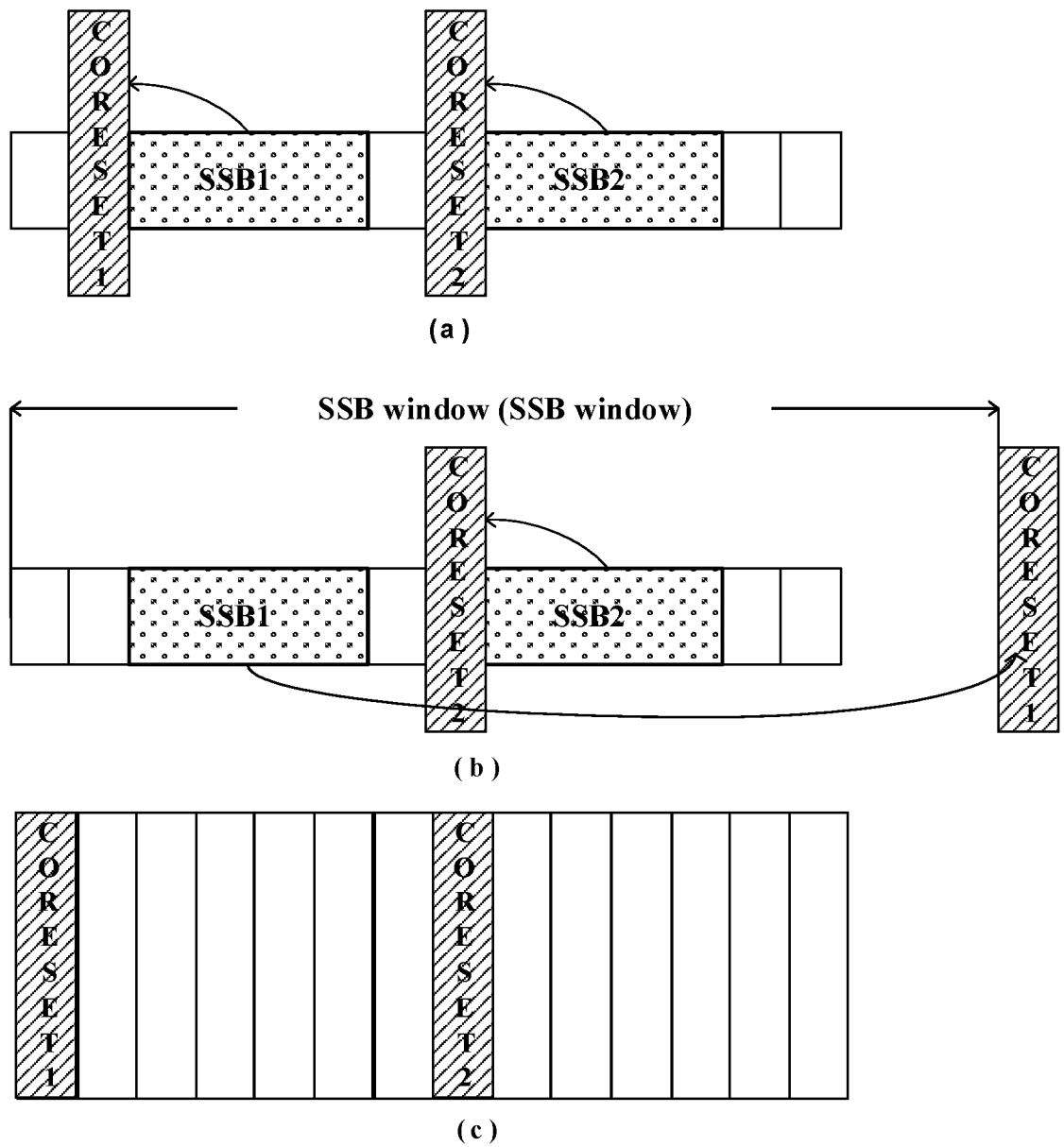
FIG. 12 is a schematic structural diagram that a CORESET is transmitted only in a slot in which an SSB is located according to the present embodiment.

Case 1: the CORESET is transmitted in a slot containing a synchronization signal block (as shown in (a) of FIG. 12, FIG. 12 is a schematic structural diagram that a CORESET is transmitted in a slot in which a synchronization signal block (Synchronization Signal Block, SSB) is located according to the present embodiment: that is, two synchronization signal blocks SSB1, SSB2 are included in one slot, and respectively corresponding CORESETs are in a symbol previous to a symbol occupied by the SSBs).

Case 2: the CORESET is transmitted in a slot containing a synchronization signal block and transmitted in a slot not containing the synchronization signal block (as shown in (b) of FIG. 12, it is a schematic structural diagram that a CORESET is transmitted in a slot in which an SSB is located and transmitted in a slot not containing the synchronization signal block: that is, two synchronization signal blocks SSB1, SSB2 are included in one slot, a CORESET corresponding to the SSB2 is in a symbol previous to a symbol occupied by the SSB, and a CORESET corresponding to the SSB1 is transmitted in a slot not containing the SSB).

Case 3: the CORESET is transmitted in a slot not containing a synchronization signal block (as shown in (c) of FIG. 12, it is a schematic structural diagram that a CORESET is transmitted in a slot not containing a synchronization signal block: that is, in one slot not containing an SSB, CORESETs are mapped to the first and seventh symbols in the slot, respectively).

Figure 13:
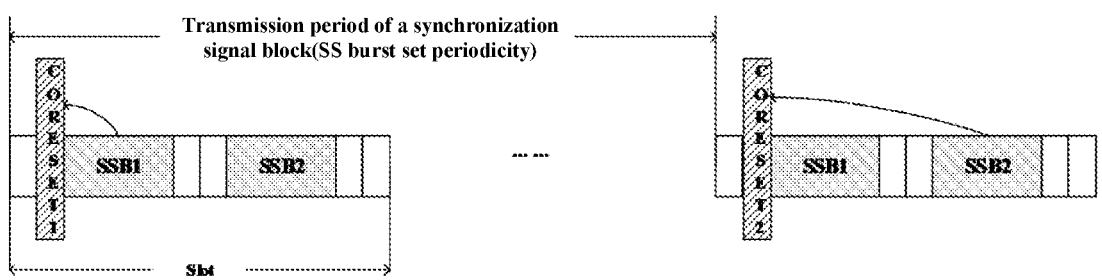
FIG. 13 is a schematic diagram of use of a plurality of synchronization signal block transmission periods according to the present embodiment.

As shown in FIG. 13, there is another form for the transmission of the control resource set in a slot containing a synchronization signal block, that is, a plurality of synchronization signal block transmission periods are used. FIG. 13 is a schematic diagram of use of a plurality of synchronization signal block transmission periods according to the present embodiment (in FIG. 13, SS burst set periodicity refers to a transmission period of synchronization signal blocks). Two synchronization signal blocks are mapped in one slot (slot), a CORESET1 corresponding to a former SSB is transmitted in a slot in which an SSB1 is located in a first period, and a CORESET2 corresponding to a latter SSB is transmitted in a slot in which an SSB2 is located in a second period. In this case, the transmission period of the CORESET is twice that of the SSBs.

That CORESETs corresponding to which SSBs are transmitted in which SS burst set period may be predefined by a system, for example, an odd number of CORESETs corresponding to SSBs are included on a radio frame with a system frame number SFN mode 4=0; and an even number of CORESETs corresponding to SSBs are included on a radio frame with a SFN mode 4=2. Alternatively, an odd number of CORESETs corresponding to SSBs are included on a radio frame with a SFN mode 4=0 or 1; and an even number of CORESETs corresponding to SSBs are included on a radio frame with a SFN mode 4=2 or 3.

An indication bit may be introduced into a CORESET configuration information indication field of the PBCH to indicate information of a slot in which the CORESET of a current carrier is located to the terminal. For example, 2 bits are used for indication, '00' represents 'the control resource set is transmitted in a slot containing a synchronization signal block', '01' represents 'the control resource set is transmitted in a slot containing a synchronization signal block and also transmitted in a slot not containing the synchronization signal block', '10' represents 'the control resource set is transmitted in a slot not containing a synchronization signal block', and '11' represents 'a manner of CORESET transmission spanning periods (corresponding to FIG. 13)'.

Alternatively, 1 bit is used for indication, '0' represents 'the control resource set is transmitted in a slot containing a synchronization signal block, and '1' represents 'the control resource set is transmitted only in a slot not containing a synchronization signal block'. In this case, '0' actually contains three cases shown in (a) of FIG. 12, (b) of FIG. 12 and FIG. 13.

Alternatively, 1 bit is used for indication, '0' represents 'the control resource set is transmitted only in a slot containing a synchronization signal block; and '1' represents 'the control resource set is transmitted in a slot not containing a synchronization signal block'. In this case, '0' actually contains two cases shown in (a) of FIG. 12 and FIG. 13; and '1' actually contains two cases shown in (b) of FIG. 12 and (c) of FIG. 12.

Alternatively, it is specified in the protocol that any two of the foregoing four cases are contained, and 1 bit is further used in the PBCH to indicate which configuration is particularly used for a current carrier.

Implementation Manner 4:

The present implementation manner describes indication manners for position information of a symbol occupied by the CORESET in a slot; where the position information of the symbol occupied by the CORESET in the slot includes: a starting symbol index of the symbol occupied by the CORESET in the slot and a number of symbols occupied by the CORESET in the slot.

Figure 14:
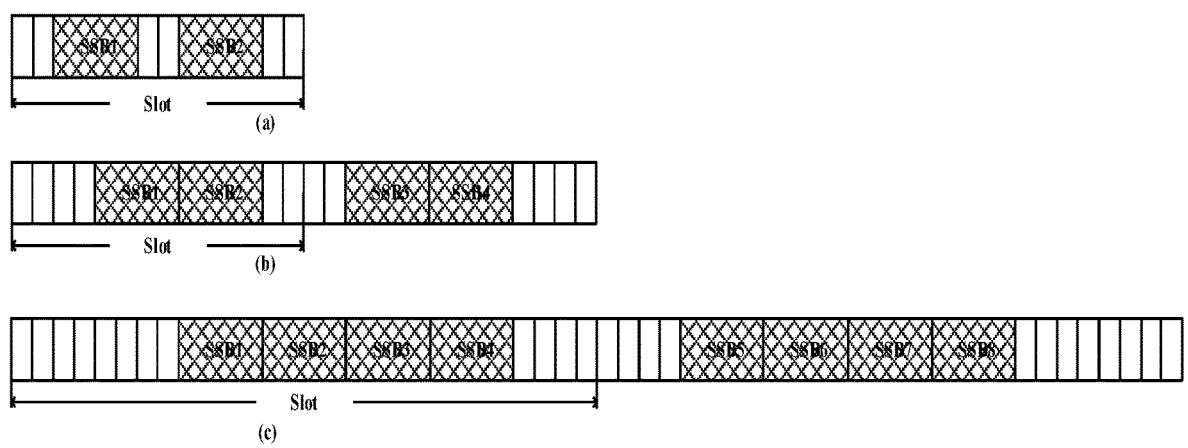
FIG. 14 is a schematic diagram of mapping patterns of a current synchronization signal block (SSB) to a slot according the present embodiment.

As shown in FIG. 14, FIG. 14 is a schematic diagram of mapping patterns of a current synchronization signal block (SSB) to a slot according the present embodiment, where (a)

of FIG. 14 is applied to mapping of synchronization signal blocks with subcarrier spacing of 15 kHz or 30 kHz (pattern 2) to a slot; (b) of FIG. 14 is applied to mapping of synchronization signal blocks with subcarrier spacing of 30 kHz (pattern 1) or 120 kHz to a slot; and (c) of FIG. 14 is applied to mapping of synchronization signal blocks with subcarrier spacing of 240 kHz to a slot. The slots in (a) of FIG. 14 and (b) of FIG. 14 are slots corresponding to subcarrier spacing of current synchronization signal blocks; and the slot in (c) of FIG. 14 corresponds to a slot of 120 kHz.

Figure 15:
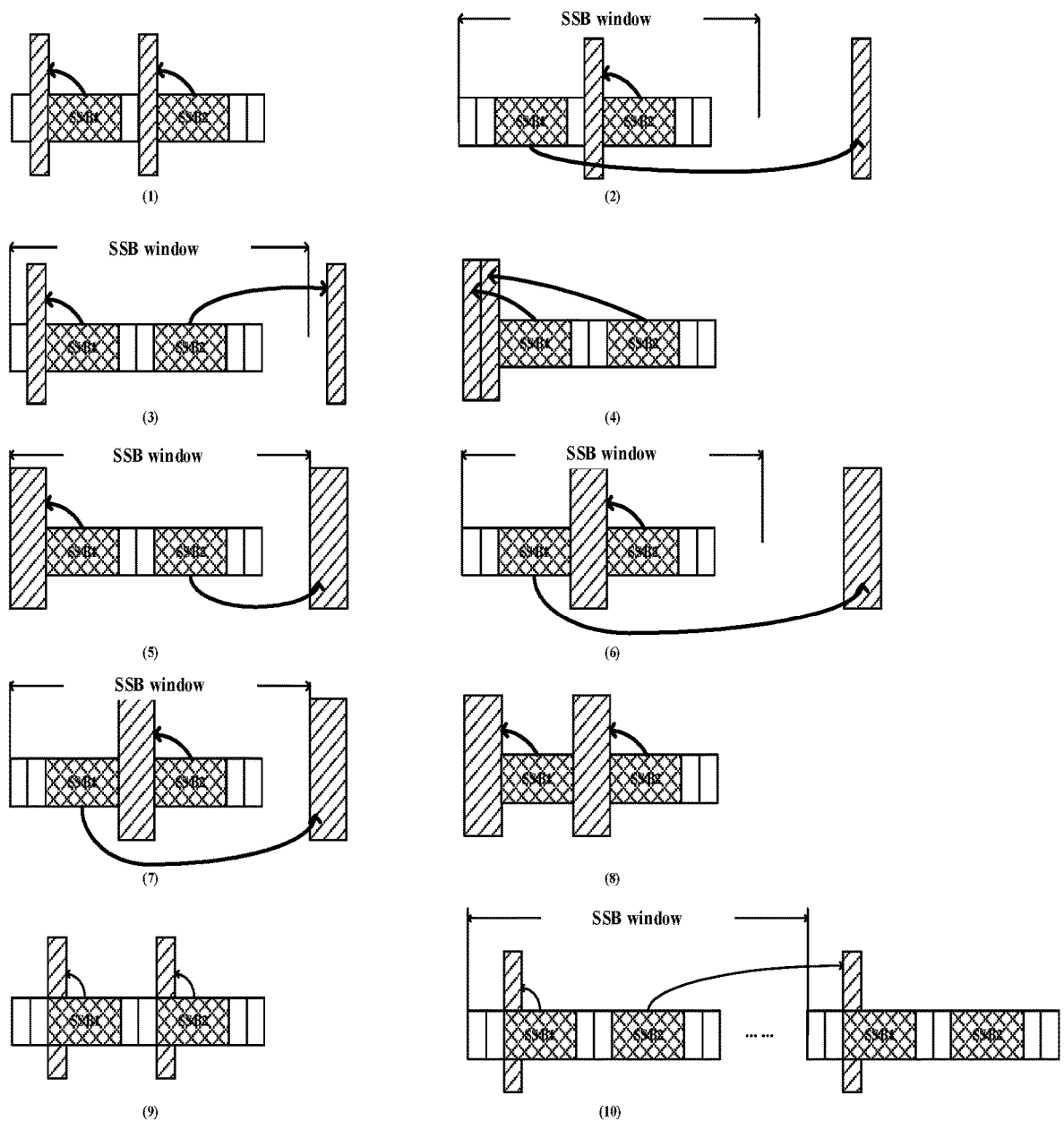
FIG. 15 is a schematic diagram I of position information of a symbol occupied by a CORESET in a slot according to the present embodiment.

Sub-Implementation Manner 4.1:

For the mapping of the synchronization signal blocks of 15 kHz or 30 kHz (pattern 2) shown in (a) of FIG. 14, FIG. 15 is a schematic diagram I of position information of a symbol occupied by a CORESET in a slot according to the present embodiment. As shown in FIG. 15, the position information of the symbol occupied by the CORESET includes one or more of the following, where an arrow starting from an SSB points to a CORESET corresponding thereto.

In a configuration of FIG. 15 (1), each CORESET occupies 1 symbol, and is mapped in a same slot, and an SSB particularly occupies one symbol before the SSB, that is, a CORESET corresponding to the first SSB in the slot occupies the second symbol in the slot, and a CORESET corresponding to the second SSB in the slot occupies the eighth symbol in the slot.

In a configuration of FIG. 15 (2), each CORESET occupies 1 symbol, and a CORESET corresponding to the first SSB in the slot is mapped to the eighth symbol of a slot outside a 5 ms SSB time window; and a CORESET corresponding to the second SSB in the slot is mapped in the slot in which the SSB is located, and particularly occupies 1 symbol before the SSB, that is, the eighth symbol in the slot.

In a configuration of FIG. 15 (3), each CORESET occupies 1 symbol, and a CORESET corresponding to the first SSB in the slot is mapped in the slot in which the SSB is located, and particularly occupies 1 symbol before the SSB, that is, the second symbol in the slot; and a CORESET corresponding to the second SSB in the slot is mapped to the second symbol of a slot outside a 5 ms SSB time window.

In a configuration of FIG. 15 (4), each CORESET occupies 1 symbol, and is mapped in the slot in which an SSB is located, and the SSB particularly occupies first two symbols in the slot, that is, a CORESET corresponding to the first SSB in the slot occupies the first symbol in the slot, and a CORESET corresponding to the second SSB in the slot occupies the second symbol in the slot.

In a configuration of FIG. 15 (5), each CORESET occupies 2 symbols, and a CORESET corresponding to the first SSB in the slot is mapped in the slot in which the SSB is located, and particularly occupies first two symbols of the slot in which the SSB is located; and a CORESET corresponding to the second SSB in the slot is mapped to the first and second symbols of a slot outside a 5 ms SSB time window. In a configuration of FIG. 15 (6), each CORESET occupies 2 symbol, and a CORESET corresponding to the first SSB in the slot is mapped to the seventh and eighth symbols of a slot outside a 5 ms SSB time window; and a CORESET corresponding to the second SSB in the slot is mapped in the slot in which the SSB is located, and particularly occupies the seventh and eighth symbols of the slot in which the SSB is located.

In a configuration of FIG. 15 (7), each CORESET occupies 2 symbol, and a CORESET corresponding to the first SSB in the slot is mapped to the first and second symbols of a slot outside a 5 ms SSB time window; and a CORESET corresponding to the second SSB in the slot is mapped in the slot in which the SSB is located, and particularly occupies the seventh and eighth symbols of the slot in which the SSB is located.

In a configuration of FIG. 15 (8), each CORESET occupies 2 symbol, and is mapped in a same slot, and an SSB particularly occupies two symbols before the SSB, that is, a CORESET corresponding to the first SSB in the slot occupies the first and second symbols in the slot, and a CORESET corresponding to the second SSB in the slot occupies the seventh and eighth symbols in the slot.

In a configuration of FIG. 15 (9), each CORESET occupies 1 or 2 or 3 or 4 symbols, a multiplexing manner of frequency-division multiplexing (Frequency-division multiplexing, FDM) is used for CORESETs and corresponding SSBs, that is, a CORESET corresponding to the first SSB in the slot is mapped in the slot in which the SSB is located. In an embodiment, when a CORESET occupies 1 symbol, it occupies the third symbol of a slot in which an SSB is located; for 2 symbols of a CORESET, the third and fourth symbols are occupied; for 3 symbols of a CORESET, the third, fourth and fifth symbols are occupied; for 4 symbols of a CORESET, the third, fourth, fifth and sixth symbols are occupied; and a CORESET corresponding to the second SSB in the slot is mapped in the slot in which the SSB is located. In an embodiment, when a CORESET occupies 1 symbol, it occupies the ninth symbol of a slot in which an SSB is located; for 2 symbols of a CORESET, the ninth and tenth symbols are occupied; for 3 symbols of a CORESET, the ninth, tenth and eleventh symbols are occupied; for 4 symbols of a CORESET, the ninth, tenth, eleventh and twelfth symbols are occupied; and a recourse other than an SSB is occupied in frequency domain.

In a configuration of FIG. 15 (10), each CORESET occupies 1 or 2 or 3 or 4 symbols, a multiplexing manner of FDM is used for CORESETs and corresponding SSBs, that is, a CORESET corresponding to the first SSB in the slot is mapped in the slot in which the SSB is located. In an embodiment, when a CORESET occupies 1 symbol, it occupies the third symbol of a slot in which an SSB is located; for 2 symbols of a CORESET, the third and fourth symbols are occupied; for 3 symbols of a CORESET, the third, fourth and fifth symbols are occupied; for 4 symbols of a CORESET, the third, fourth, fifth and sixth symbols are occupied; and a CORESET corresponding to the second SSB in the slot is mapped to a slot outside a 5 ms SSB time window. In an embodiment, when a CORESET occupies 1 symbol, it occupies the third symbol of a slot in which an SSB is located; for 2 symbols of a CORESET, the third and fourth symbols are occupied; for 3 symbols of a CORESET, the third, fourth and fifth symbols are occupied; and for 4 symbols of a CORESET, the third, fourth, fifth and sixth symbols are occupied. A resource other than a frequency domain resource corresponding to an SSB is occupied in frequency domain.

Figure 16:
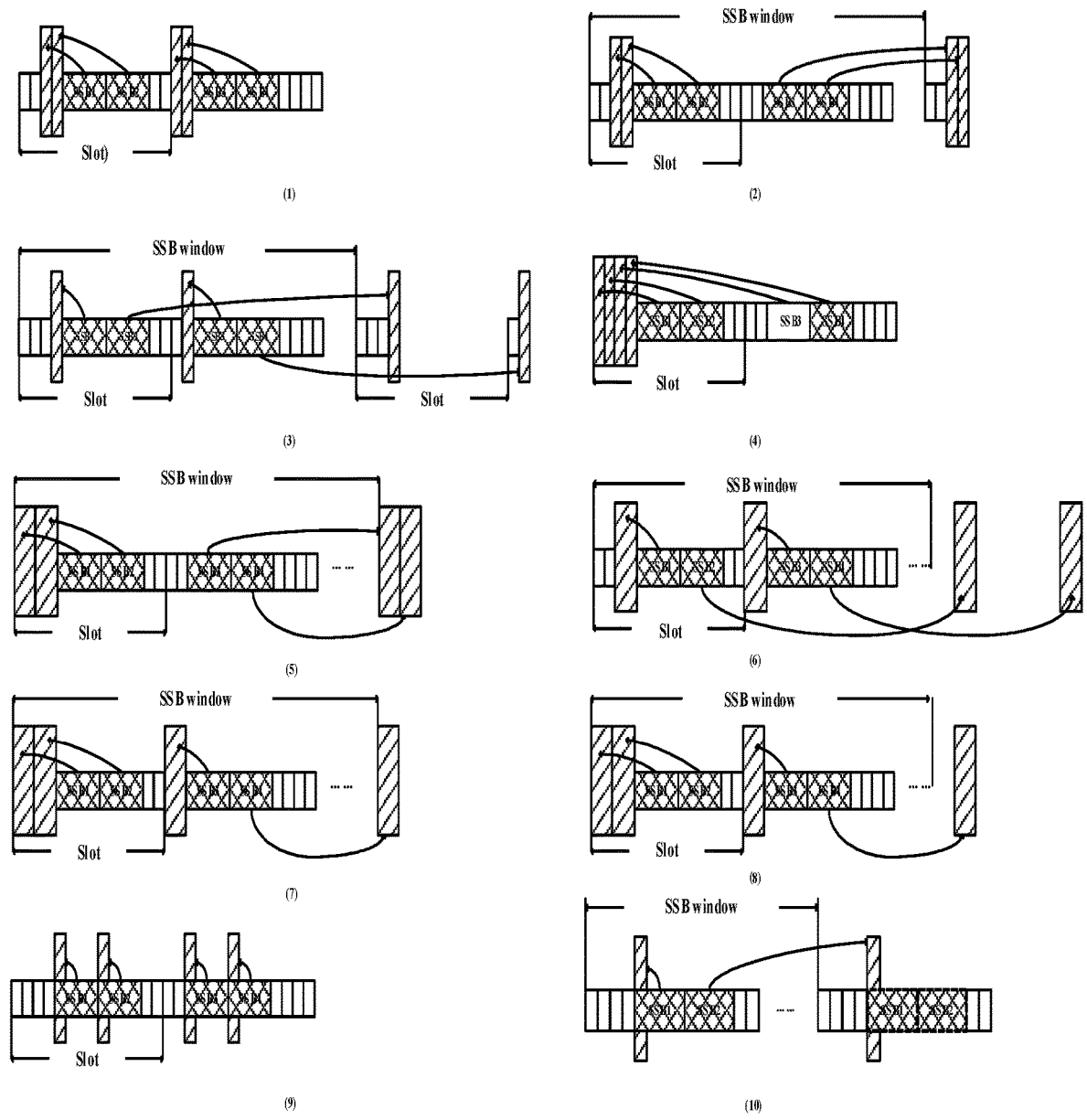
FIG. 16 is a schematic diagram II of position information of a symbol occupied by a CORESET in a slot according to the present embodiment.

Sub-Implementation Manner 4.2:

For the mapping of the synchronization signal blocks of 30 kHz (pattern 1) or 120 kHz shown in (b) of FIG. 14, a mapping resource configuration is performed based on 2 slots and 4 SSBs as a period. FIG. 16 is a schematic diagram II of position information of a symbol occupied by a CORESET in a slot according to the present embodiment. As shown in FIG. 16, the position information of the symbol occupied by the CORESET includes one or more of the following, where an arrow starting from an SSB points to a CORESET corresponding thereto.

In a configuration of FIG. 16 (1), each CORESET occupies 1 symbol, where a CORESET of the first SSB occupies the third symbol in a former slot; a CORESET of the second SSB occupies the fourth symbol in the former slot; a CORESET of the third SSB occupies the first symbol in a latter slot; and a CORESET of the fourth SSB occupies the second symbol in the latter slot.

In a configuration of FIG. 16 (2), each CORESET occupies 1 symbol, where a CORESET of the first SSB occupies the third symbol in a former slot; a CORESET of the second SSB occupies the fourth symbol in the former slot; a CORESET of the third SSB occupies the third symbol in a slot outside a 5 ms SSB time window; a CORESET of the fourth SSB occupies the fourth symbol in the slot outside a 5 ms SSB time window; and 'spacing between the CORESET of the first SSB and the CORESET of the third SSB' is equal to "spacing between the CORESET of the second SSB and the CORESET of the fourth SSB", for example, the spacing is equal to 5 ms.

In a configuration of FIG. 16 (3), each CORESET occupies 1 symbol, where a CORESET of the first SSB occupies the fourth symbol in a former slot; a CORESET of the second SSB occupies the fourth symbol of a slot outside a 5 ms SSB time window; a CORESET of the third SSB occupies the fourth symbol in a latter slot; a CORESET of the fourth SSB occupies the second symbol in the slot outside a 5 ms SSB time window; and 'spacing between the CORESET of the first SSB and the CORESET of the third SSB' is equal to "spacing between the CORESET of the second SSB and the CORESET of the fourth SSB", for example, the spacing is equal to 5 ms.

In a configuration of FIG. 16 (4), each CORESET occupies 1 symbol, and CPRESETs are mapped to the first 4 symbols in a first slot, respectively. In an embodiment, a CORESET of the first SSB occupies the first symbol in a former slot; a CORESET of the second SSB occupies the second symbol in the former slot; a CORESET of the third SSB occupies the third symbol in the former slot; and a CORESET of the fourth SSB occupies the fourth symbol in the former slot.

In a configuration of FIG. 16 (5), each CORESET occupies 2 symbols, where a CORESET of the first SSB occupies the first and second symbols in a former slot; a CORESET of the second SSB occupies the third and fourth symbols in the former slot; a CORESET of the third SSB occupies the first and second symbols in a slot outside a 5 ms SSB time window; a CORESET of the fourth SSB occupies the third and fourth symbols in the slot outside a 5 ms SSB time window; and 'time domain spacing between the CORESET of the first SSB and the CORESET of the third SSB' is equal to "time domain spacing between the CORESET of the second SSB and the CORESET of the fourth SSB", for example, the spacing is equal to 5 ms.

In a configuration of FIG. 16 (6), each CORESET occupies 2 symbols, where a CORESET of the first SSB occupies the third and fourth symbols in a former slot; a CORESET of the second SSB occupies the first and second symbols in a latter slot; a CORESET of the third SSB occupies the third and fourth symbols in a slot outside a 5 ms SSB time window; a CORESET of the fourth SSB occupies the first and second symbols in the slot outside a 5 ms SSB time window; and 'time domain spacing between the CORESET of the first SSB and the CORESET of the third SSB' is equal to "time domain spacing between the CORESET of the second SSB and the CORESET of the fourth SSB", for example, the spacing is equal to 5 ms.

In a configuration of FIG. 16 (7), each CORESET occupies 2 symbols, where a CORESET of the first SSB occupies the first and second symbols in a former slot; a CORESET of the second SSB occupies the third and fourth symbols in the former slot; a CORESET of the third SSB occupies the first and second symbols in a latter slot; a CORESET of the fourth SSB occupies the first and second symbols in a slot outside a 5 ms SSB time window; and 'time domain spacing between the CORESET of the first SSB and the CORESET of the fourth SSB' is equal to 5 ms.

In a configuration of FIG. 16 (8), each CORESET occupies 2 symbols, where a CORESET of the first SSB occupies the first and second symbols in a former slot; a CORESET of the second SSB occupies the third and fourth symbols in the former slot; a CORESET of the third SSB occupies the first and second symbols in a former slot; a CORESET of the fourth SSB occupies the first and second symbols in a slot outside a 5 ms SSB time window; and 'time domain spacing between the CORESET of the second SSB and the CORESET of the fourth SSB' is equal to 5 ms, or 'time domain spacing between the CORESET of the third SSB and the CORESET of the fourth SSB' is equal to 5 ms.

In a configuration of FIG. 16 (9), each CORESET occupies 1 or 2 or 3 or 4 symbols, a multiplexing manner of FDM is used for CORESETs and corresponding SSBs, that is:

a CORESET corresponding to the first SSB is mapped in a slot in which the SSB is located. In an embodiment, when a CORESET occupies 1 symbol, it occupies the fifth symbol of a slot in which an SSB is located; for two symbols of a CORESET, the fifth and sixth symbols are occupied; for three symbols of a CORESET, the fifth, sixth and seventh symbols are occupied; for four symbols of a CORESET, the fifth, sixth, seventh and eighth symbols are occupied; and a recourse other than an SSB is occupied in frequency domain.

A CORESET corresponding to the second SSB is mapped in a slot in which the SSB is located. In an embodiment, when a CORESET occupies 1 symbol, it occupies the ninth symbol of a slot in which an SSB is located; for two symbols of a CORESET, the ninth and tenth symbols are occupied; for three symbols of a CORESET, the ninth, tenth and eleventh symbols are occupied; for four symbols of a CORESET, the ninth, tenth, eleventh and twelfth symbols are occupied; and a recourse other than an SSB is occupied in frequency domain.

A CORESET corresponding to the third SSB is mapped in a slot in which the SSB is located. In an embodiment, when a CORESET occupies one symbol, it occupies the third symbol of a slot in which an SSB is located; for two symbols of a CORESET, the third and fourth symbols are occupied; for three symbols of a CORESET, the third, fourth and fifth symbols are occupied; for four symbols of a CORESET, the third, fourth, fifth and sixth symbols are occupied; and a recourse other than an SSB is occupied in frequency domain.

A CORESET corresponding to the fourth SSB is mapped in a slot in which the SSB is located. In an embodiment, when a CORESET occupies 1 symbol, it occupies the seventh symbol of a slot in which an SSB is located; for two symbols of a CORESET, the seventh and eighth symbols are occupied; for three symbols of a CORESET, the seventh, eighth and ninth symbols are occupied; for four symbols of a CORESET, the seventh, eighth, ninth and tenth symbols are occupied; and a recourse other than an SSB is occupied in frequency domain.

In a configuration of FIG. 16 (10), each CORESET occupies 1 or 2 or 3 or 4 symbols, a multiplexing manner of FDM is used for CORESETs and corresponding SSBs, that is:

a CORESET corresponding to the first SSB is mapped in a slot in which the SSB is located. In an embodiment, when a CORESET occupies 1 symbol, it occupies the fifth symbol of a slot in which an SSB is located; for two symbols of a CORESET, the fifth and sixth symbols are occupied; for three symbols of a CORESET, the fifth, sixth and seventh symbols are occupied; for four symbols of a CORESET, the fifth, sixth, seventh and eighth symbols are occupied; and a recourse other than an SSB is occupied in frequency domain.

A CORESET corresponding to the second SSB is mapped in a slot outside a 5 ms time window. In an embodiment, when a CORESET occupies 1 symbol, it occupies the fifth symbol; for two symbols of a CORESET, the fifth and sixth symbols are occupied; for three symbols of a CORESET, the fifth, sixth and seventh symbols are occupied; for four symbols of a CORESET, the fifth, sixth, seventh and eighth symbols are occupied; and a recourse other than a frequency domain resource corresponding to an SSB is occupied in frequency domain. in addition, 'spacing between the CORESET of the first SSB and the CORESET of the third SSB' is equal to 5 ms.

A CORESET corresponding to the third SSB is mapped in a slot in which the SSB is located. In an embodiment, when a CORESET occupies 1 symbol, it occupies the third symbol of a slot in which an SSB is located; for two symbols of a CORESET, the third and fourth symbols are occupied; for three symbols of a CORESET, the third, fourth and fifth symbols are occupied; for four symbols of a CORESET, the third, fourth, fifth and sixth symbols are occupied; and a recourse other than an SSB is occupied in frequency domain.

A CORESET corresponding to the fourth SSB is mapped in a slot outside a 5 ms time window. In an embodiment, when a CORESET occupies 1 symbol, it occupies the seventh symbol; for two symbols of a CORESET, the seventh and eighth symbols are occupied; for three symbols of a CORESET, the seventh, eighth, and ninth symbols are occupied; for four symbols of a CORESET, the seventh, eighth, ninth and tenth symbols are occupied; and a recourse other than a frequency domain resource corresponding to an SSB is occupied in frequency domain. In addition, 'spacing between the CORESET of the second SSB and the CORESET of the fourth SSB' is equal to 5 ms.

Figure 17:
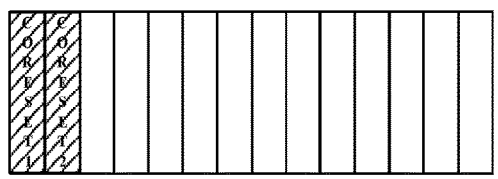
FIG. 17 is a schematic diagram I that a CORESET is mapped to a slot outside an SSB according to the present embodiment.
Figure 17:
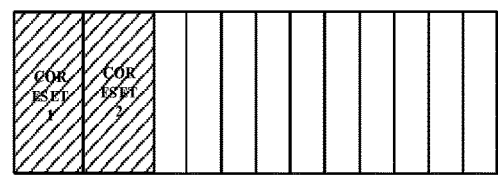
Figure 17:
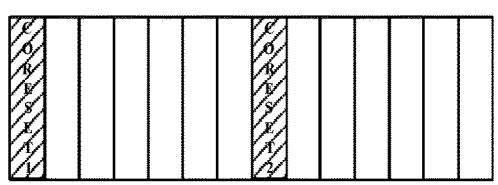
Figure 17:
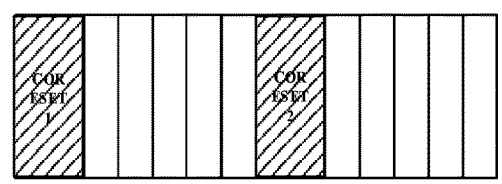
Figure 17:
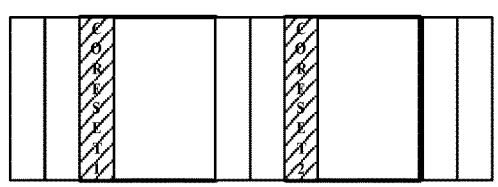
Figure 17:
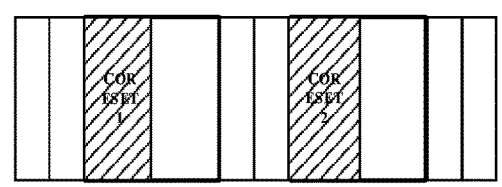
Figure 17:
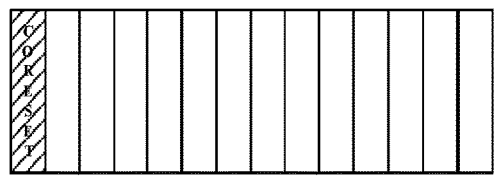
Figure 17:
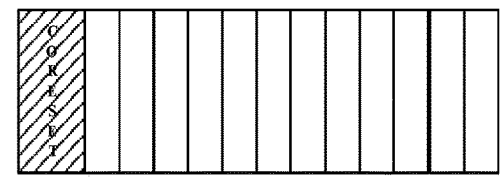
Figure 18:
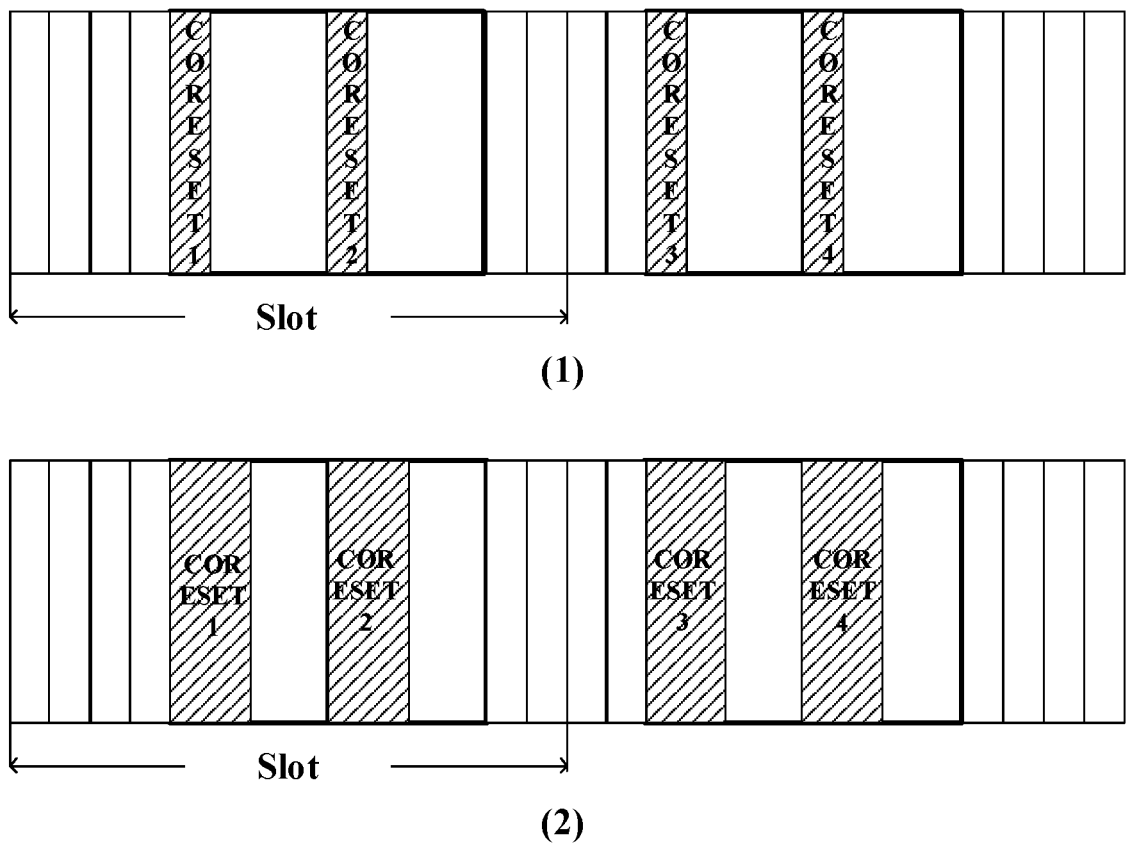
FIG. 18 is a schematic diagram II that a CORESET is mapped to a slot outside an SSB according to the present embodiment.

Sub-Implementation Manner 4.3:

When a CORESET is mapped only to a slot outside an SSB, FIG. 17 is a schematic diagram I that a CORESET is mapped to a slot outside an SSB according to the present embodiment, and FIG. 18 is a schematic diagram II that a CORESET is mapped to a slot outside an SSB according to the present embodiment. As shown in FIGS. 17 and 18, position information of a symbol occupied by the CORESET in a slot includes one or more of the following.

In a configuration of FIG. 17 (1), a slot includes 2 CORESETs, each of the CORESETs occupies 1 symbol, and the CORESETs are located on the first and second symbols in the slot, respectively.

In a configuration of FIG. 17 (2), a slot includes 2 CORESETs, each of the CORESETs occupies 2 symbols. In an embodiment, one CORESET is mapped to the first and second symbols in the slot, and the other CORESET is mapped to the third and fourth symbols in the slot.

In a configuration of FIG. 17 (3), a slot includes 2 CORESETs, each of the CORESETs occupies 1 symbol, and the CORESETs are located on the first and eighth symbols in the slot, respectively.

In a configuration of FIG. 17 (4), a slot includes 2 CORESETs, each of the CORESETs occupies 2 symbols. In an embodiment, one CORESET is mapped to the first and second symbols in the slot, and the other CORESET is mapped to the eighth and ninth symbols in the slot.

In a configuration of FIG. 17 (5), a slot includes 2 CORESETs, each of the CORESETs occupies 1 symbol, and the CORESETs are located on the third and ninth symbols in the slot, respectively.

In a configuration of FIG. 17 (6), a slot includes 2 CORESETs, each of the CORESETs occupies 2 symbols. In an embodiment, one CORESET is mapped to the third and fourth symbols in the slot, and the other CORESET is mapped to the ninth and tenth symbols in the slot.

In a configuration of FIG. 17 (7), a slot includes 1 CORESET, which occupies 1 symbol. In an embodiment, the CORESET is mapped to the first symbol in the slot.

In a configuration of FIG. 17 (8), a slot includes 1 CORESET, which occupies 2 symbols. In an embodiment, the CORESET is mapped to the first and second symbols in a slot.

In a configuration of FIG. 18 (1), with two slots as a configuration period, 4 CORESETs are included, and each CORESET includes 1 symbol: the first CORESET is mapped to the fifth symbol of a former slot, the second CORESET is mapped to the ninth symbol of the former slot, the third CORESET is mapped to the third symbol of a latter slot, and the fourth CORESET is mapped to the the seventh symbol of the latter slot.

In a configuration of FIG. 18 (2), with two slots as a configuration period, 4 CORESETs are included, and each CORESET includes 2 symbols: the first CORESET is mapped to the fifth and sixth symbols of a former slot, the second CORESET is mapped to the ninth and tenth symbols of the former slot, the third CORESET is mapped to the third and fourth symbols of a latter slot, and the fourth CORESET is mapped to the seventh and eighth symbols of the latter slot.

In the foregoing configurations, a position of a symbol occupied by a currently used CORESET in a slot may be indicated to a terminal by the following manners.

According to the CORESET bandwidth configuration described in the implementation manner 1, the terminal can determine the bandwidth of the current CORESET, and when the CORESET bandwidth takes the minimum channel bandwidth, since the bandwidth value is relatively small, a manner of time-division multiplexing for CORESETs and SSBs is preferred.

Conversely, when the CORESET bandwidth takes a larger value, that is, the minimum UE bandwidth, a manner of frequency-division multiplexing for CORESETs and SSBs is preferred.

In addition, according to the manner described in the implementation manner 3, the terminal can determine the information of the slot in which the CORESET is located.

The following 3 tables, Table 1, Table 2, and Table 3, are defined.

Table 1 is applicable to a case that the CORESET bandwidth is configured as 'minimum channel bandwidth', and information of a slot in which the CORESET is located is 'the control resource set is transmitted in a slot containing a synchronization signal block'; and in a PBCH, 3 bits particularly indicate to a terminal which of the eight configurations in Table 1 is used.

Table 2 is applicable to a case that the CORESET bandwidth takes a greater value, that is, 'minimum UE bandwidth', and information of a slot in which the CORESET is located is 'the control resource set is transmitted in a slot containing a synchronization signal block'; and in a PBCH, 3 bits particularly indicate to a terminal which of the eight configurations in Table 2 is used.

Table 3 is applicable to a case that information of a slot in which the CORESET is located is 'the control resource set is transmitted in a slot not containing a synchronization signal block'; or subcarrier spacing of the CORESET and subcarrier spacing of the synchronization signal block are different, and then the CORESET and the synchronization signal block belong to different bandwidth parts (Bandwidth Parts, BWP); and in a PBCH, 3 bits particularly indicate to a terminal which of the eight configurations in Table 3 is used.

Implementation Manner 5:

The present implementation manner describes an indication manner of the CORESET monitoring window (PDCCH monitoring window) configuration information.

The CORESET monitoring window configuration information includes at least one of the following information: a monitoring period of the CORESET, a starting position of the monitoring window, time domain duration of a monitoring window, and a time domain offset between adjacent monitoring windows.

The CORESET monitoring window is also referred to as a physical downlink control channel PDCCH monitoring window, each monitoring window corresponds to a synchronization signal block, and a monitoring window of the CORESET includes one or more CORESET monitoring opportunities, that is, one or more resources for transmitting a PDCCH. A base station selects one PDCCH transmission resource in a CORESET monitoring window for PDCCH transmission, and a terminal may attempt to receive a

TABLE 1

| Index | Number of CORESET OFDM Symbols | 15 kHz/30 kHz (pattern 2) | 30 kHz (pattern 1)/120 kHz |
|---|---|---|---|
| 000 | 1 | Configuration of FIG. 15 (1) | Configuration of FIG. 16 (1) |
| 001 | 1 | Configuration of FIG. 15 (2) | Configuration of FIG. 16 (2) |
| 010 | 1 | Configuration of FIG. 15 (3) | Configuration of FIG. 16 (3) |
| 011 | 1 | Configuration of FIG. 15 (4) | Configuration of FIG. 16 (4) |
| 100 | 2 | Configuration of FIG. 15 (5) | Configuration of FIG. 16 (5) |
| 101 | 2 | Configuration of FIG. 15 (6) | Configuration of FIG. 16 (6) |
| 110 | 2 | Configuration of FIG. 15 (7) | Configuration of FIG. 16 (7) |
| 111 | 2 | Configuration of FIG. 15 (8) | Configuration of FIG. 16 (8) |

TABLE 2

| Index | Number of CORESET OFDM Symbols | 15 kHz/30 kHz (pattern 2) | 30 kHz (pattern 1)/120 kHz |
|---|---|---|---|
| 000 | 1 | Configuration of FIG. 15(9) | Configuration of FIG. 16(9) |
| 001 | 2 | | |
| 010 | 3 | | |
| 011 | 4 | | |
| 100 | 1 | Configuration of FIG. 15(10) | Configuration of FIG. 16(10) |
| 101 | 2 | | |
| 110 | 3 | | |
| 111 | 4 | | |

TABLE 3

| Index | Number of CORESET OFDM Symbols | 15 kHz/30 kHz (pattern 2) | 30 kHz (pattern 1)/120 kHz |
|---|---|---|---|
| 000 | 1 | Configuration of FIG. 17(1) | |
| 001 | 2 | Configuration of FIG. 17(2) | |
| 010 | 1 | Configuration of FIG. 17(3) | |
| 011 | 2 | Configuration of FIG. 17(4) | |
| 100 | 1 | Configuration of FIG. 17(5) | Configuration of FIG. 18(1) |
| 101 | 2 | Configuration of FIG. 17(6) | Configuration of FIG. 18(2) |
| 110 | 1 | Configuration of FIG. 17(7) | |
| 111 | 2 | Configuration of FIG. 17(8) | |

PDCCH corresponding to the synchronization signal block on one or more PDCCH transmission resources in the CORESET monitoring window. There is a quasi-co-location (Quasi-co-location, QCL) relationship between the synchronization signal block and the CORESET or PDCCH in the corresponding monitoring window.

The monitoring period of the CORESET may also be understood as a transmission period of the CORESET, and a value of the period may be predefined, for example, as 40 ms. It is also possible to predefine values of a plurality of monitoring periods in the protocol, such as 20 ms, 40 ms, and in a PBCH, a particular value of a monitoring period of a current carrier is indicated by 1 bit.

Figure 19:
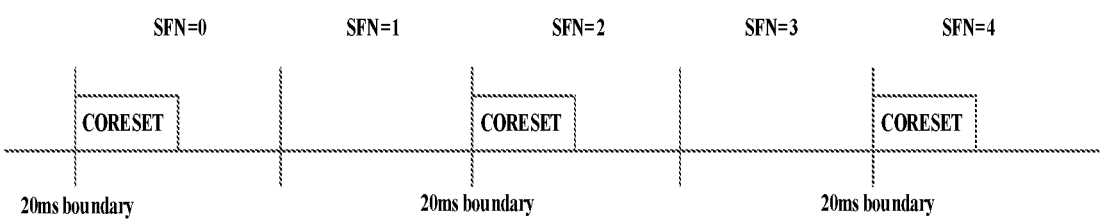
FIG. 19 is a schematic diagram that a CORESET is transmitted in a slot containing a synchronization signal block according the present embodiment.

The starting position of the monitoring window of the CORESET refers to a time domain starting position of the first CORESET monitoring window; and with 20 ms of the CORESET transmission period as an example, when the CORESET is transmitted in a slot containing a synchronization signal block, the CORESET starting position of the monitoring window is predefined. FIG. 19 is a schematic diagram that a CORESET is transmitted in a slot containing a synchronization signal block according the present embodiment, and as shown in FIG. 19, a starting position of the monitoring window of a CORESET is a starting point of a radio frame with SFN mod 2=0.

Figure 20:
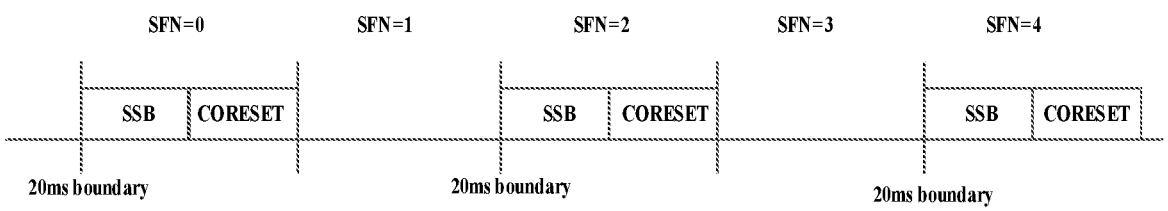
FIG. 20 is a schematic diagram that a CORESET is transmitted in a slot not containing a synchronization signal block according the present embodiment.

When the CORESET is transmitted in a slot not containing a synchronization signal block, the CORESET starting position of the monitoring window is predefined. FIG. 20 is a schematic diagram that a CORESET is transmitted in a slot not containing a synchronization signal block according the present embodiment, and as shown in FIG. 20, a starting position of the monitoring window of a CORESET is the sixth subframe (that is, the second half frame) of a radio frame with SFN mod 2=0.

Figure 21:
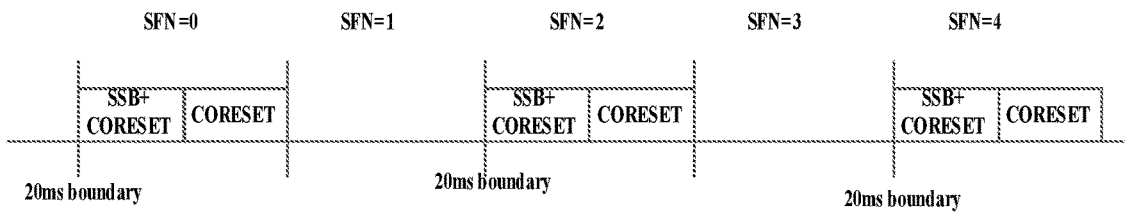
FIG. 21 is a schematic diagram that a CORESET is transmitted in a slot containing a synchronization signal block and transmitted in a slot not containing the synchronization signal block according the present embodiment.

When the CORESET is transmitted in a slot containing a synchronization signal block and also transmitted in a slot not containing the synchronization signal block, FIG. 21 is a schematic diagram that a CORESET is transmitted in a slot containing a synchronization signal block and also transmitted in a slot not containing the synchronization signal block according the present embodiment (as shown in FIG. 21, for a CORESET transmitted in a slot in which a synchronization signal block is located, a starting position of the monitoring window thereof is a starting point of a radio frame with SFN mod 2=0; and for a CORESET transmitted in a slot not containing a synchronization signal block, a starting position of the monitoring window thereof is the sixth sub-frame (that is, the second half frame) of a radio frame with SFN mod 2=0).

The time domain duration of the monitoring window of the CORESET is one or more slots; for example, the time domain duration of the monitoring window is one or more of the following: 1 slot, 2 slots, 4 slots, or M slots, where M is a number of slots occupied by synchronization signal blocks in a synchronization signal block transmission period.

When the CORESET is transmitted in a slot in which a synchronization is located, the time domain duration of the monitoring window is 1 slot; and when the CORESET is transmitted in a slot not containing a synchronization signal block, the time domain duration of the monitoring window may be one or more slots.

An indication bit may be introduced into in a CORESET configuration information indication field of the PBCH to indicate time domain duration of the CORESET monitoring window of a current carrier to the terminal. For example, 2 bits are used for indication, '00' represents 'the time domain duration of the monitoring window is 1 slot', '01' represents 'the time domain duration of the monitoring window is 2 slots', '10' represents 'the time domain duration of the monitoring window is M slots', and '11' represents 'state reservation'.

Alternatively, it is specified in the protocol that only any two of the foregoing 4 types of the time domain duration of the CORESET monitoring window are included, and 1 bit is further used in the PBCH to indicate which configuration is particularly used for a current carrier; for example, '0' represents 'the time domain duration of the monitoring window is 1 slot', and '1' represents 'the time domain duration of the monitoring window is 2 slots'.

Alternatively, it is specified in the protocol that the time domain duration of the CORESET monitoring window may be configured in one of the following three types: 1 slot, 2 slots, and 4 slots; and time domain transmission resources of the CORESET monitoring window and the time domain duration of the monitoring window are jointly indicated, and 2 bits are occupied in total, for example, '00': the CORESET is transmitted in a slot containing an SS/PBCH block, and the CORESET monitoring window length is equal to 1 slot;

'01': the CORESET is transmitted in a slot not containing an SS/PBCH block, and the CORESET monitoring window length is equal to 1 slot;

'10': the CORESET is transmitted in a slot not containing an SS/PBCH block, and the CORESET monitoring window length is equal to 2 slots;

'11': the CORESET is transmitted in a slot not containing an SS/PBCH block, and the CORESET monitoring window length is equal to 4 slots;

and an time domain offset between adjacent monitoring windows includes one or more of the following: 0, the time domain duration of the monitoring window, and 1/X of the time domain duration of the monitoring window, where X is an integer greater than 1, and a value thereof may be predefined in a protocol or indicated by a signaling.

Figure 22:
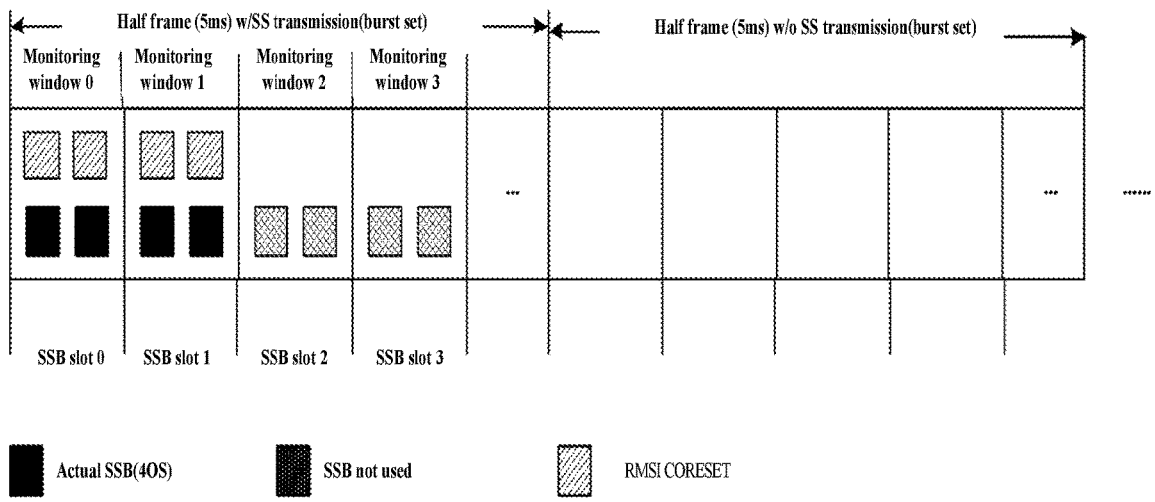
FIG. 22 is a schematic diagram that a CORESET is transmitted in a slot in which a synchronization signal block is located according the present embodiment.

FIG. 22 is a schematic diagram that a CORESET is transmitted in a slot in which a synchronization signal block is located according the present embodiment. As shown in FIG. 22, when the CORESET is transmitted in a slot in which a synchronization signal block is located, and the CORESET and a corresponding SSB are frequency-division multiplexed and transmitted, time domain duration of a monitoring window is 1 slot, and a time domain offset between adjacent monitoring windows is equal to the time domain duration of the monitoring window, that is, 1 slot. In this case, there is no overlap between the adjacent monitoring windows. In FIG. 22, 8 synchronization signal blocks included can be used as resources for transmitting a synchronization signal and a physical broadcast channel, and a base station can select some or all of them as actually transmitted synchronization signal blocks (actual SSBs).

Figure 23:
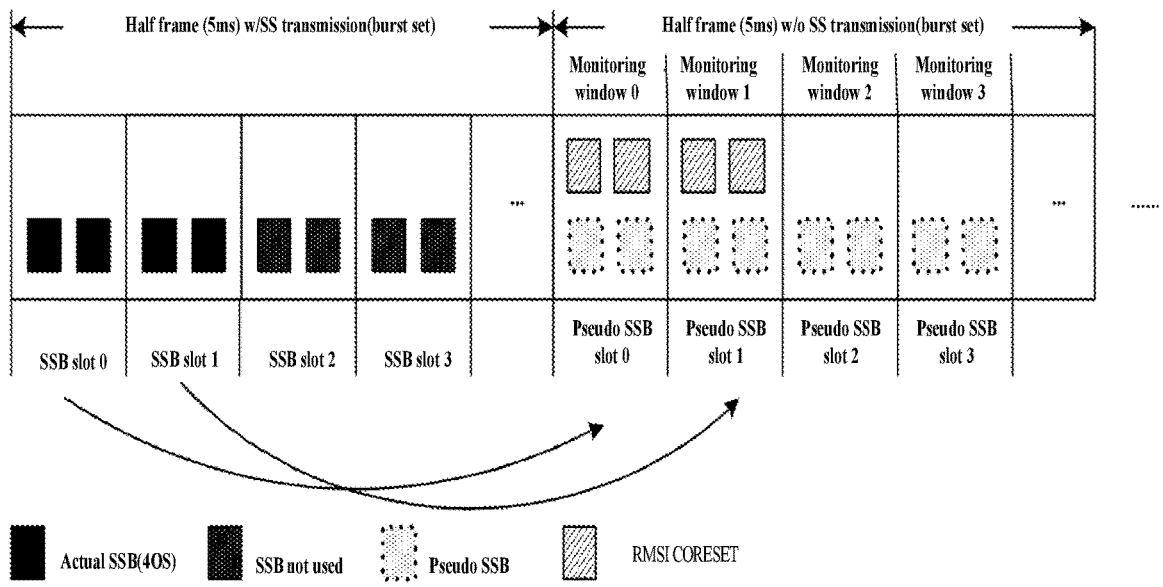
FIG. 23 is a schematic diagram I that a CORESET is transmitted in a slot not containing a synchronization signal block according the present embodiment.

FIG. 23 is a schematic diagram I that a CORESET is transmitted in a slot not containing a synchronization signal block according the present embodiment. In FIG. 23, the CORESET is transmitted in a slot not containing a synchronization signal block, that is, the second half frame of a radio frame in which a synchronization signal block is located, time domain duration of a monitoring window is 1 slot, and a time domain offset between adjacent monitoring windows is equal to the time domain duration of the monitoring window, that is, 1 slot. In this case, there is no overlap between the adjacent monitoring windows. Dashed blocks in FIG. 23 are pseudo synchronization signal blocks (pseudo SSBs), the transmission of the CORESET also avoids these pseudo synchronization signal blocks, and resources occupied by the CORESET in the slot are the same as that in FIG. 22. The advantage of this configuration is that when the transmission period of the synchronization signal blocks is 5 ms, synchronization signal blocks of the next period will also be transmitted in the slot in which the CORESET is located, and since the transmission of the CORESET avoids the resources for transmitting the synchronization signal blocks, even if the transmission period of the synchronization signal blocks is 5 ms, there is no collision between the two. A terminal does not need to know an actual synchronization signal block transmission period of the current carrier.

Figure 24:
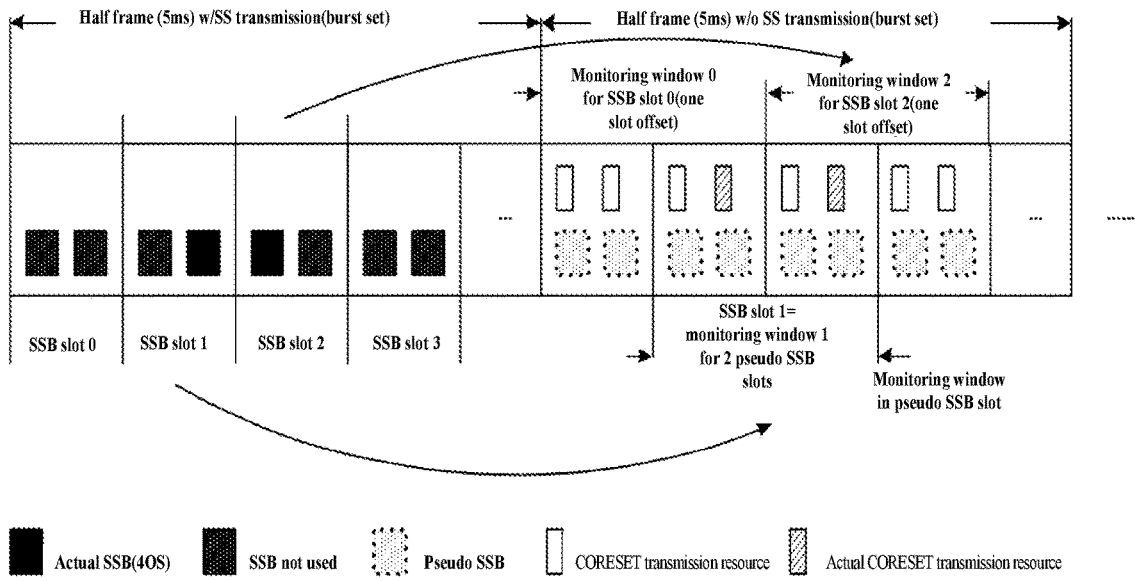
FIG. 24 is a schematic diagram II that a CORESET is transmitted in a slot not containing a synchronization signal block according the present embodiment.

FIG. 24 is a schematic diagram II that a CORESET is transmitted in a slot not containing a synchronization signal block according the present embodiment. As shown in FIG. 24, the CORESET is transmitted in a slot not containing a synchronization signal block, that is, the second half frame of a radio frame in which a synchronization signal block is located, time domain duration of a monitoring window is 2 slots, and a time domain offset between adjacent monitoring windows is equal to ½ of the time domain duration of the monitoring window, that is, 1 slot. Then the adjacent monitoring windows partially overlap. In an embodiment, the second synchronization signal block in the slot 1 in which the synchronization signal block is located is actually transmitted, this synchronization signal block corresponds to the monitoring window 1, that is, the second and third slots of the second half frame, these two slots include 4 CORESET transmission resources, and a base station selects one of them to transmit the CORESET corresponding to the synchronization signal block. Similarly, the first synchronization signal block in the slot 2 is actually transmitted, it corresponds to the monitoring window 2, that is, the third and fourth slots, and the base station selects one of the CORESET transmission resources in the 2 slots to transmit a CORESET corresponding to this synchronization signal block.

It should be noted that, CORESETs corresponding to different synchronization signal blocks cannot occupy the same CORESET transmission resources; therefore, when CORESET transmission resources are selected in the corresponding monitoring windows for the subsequent synchronization signal blocks, it is necessary to avoid CORESET transmission resources having been occupied.

Figure 25:
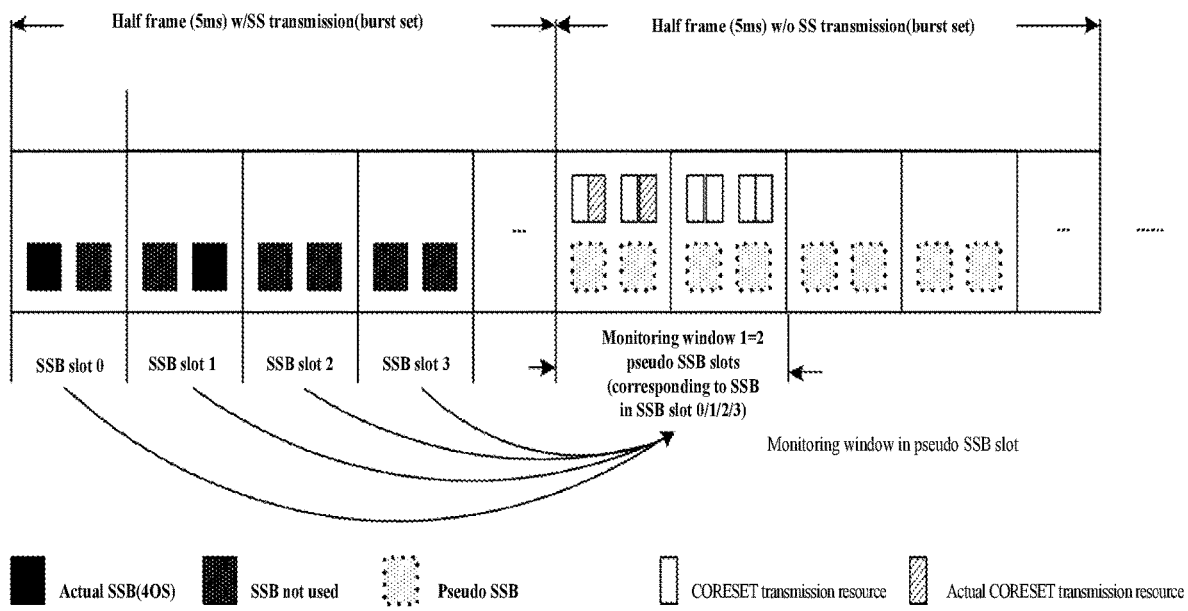
FIG. 25 is a schematic diagram that all synchronization signal blocks correspond to a same CORESET monitoring window according the present embodiment.

FIG. 25 is a schematic diagram that all synchronization signal blocks correspond to a same CORESET monitoring window according the present embodiment. As shown in FIG. 25, all the synchronization signal blocks correspond to a same CORESET monitoring window. In an embodiment, 4 slots containing synchronization signal blocks include 8 synchronization signal block resources, in this case, only two of the synchronization signal blocks are transmitted, and the 8 synchronization signal blocks correspond to the same CORESET monitoring window, and the monitoring window includes 8 CORESET transmission resources; and for a terminal, no matter which synchronization signal block is received, it is necessary to attempt to receive the corresponding CORESET on 8 CORESET monitoring opportunities in this monitoring window.

Figure 26:
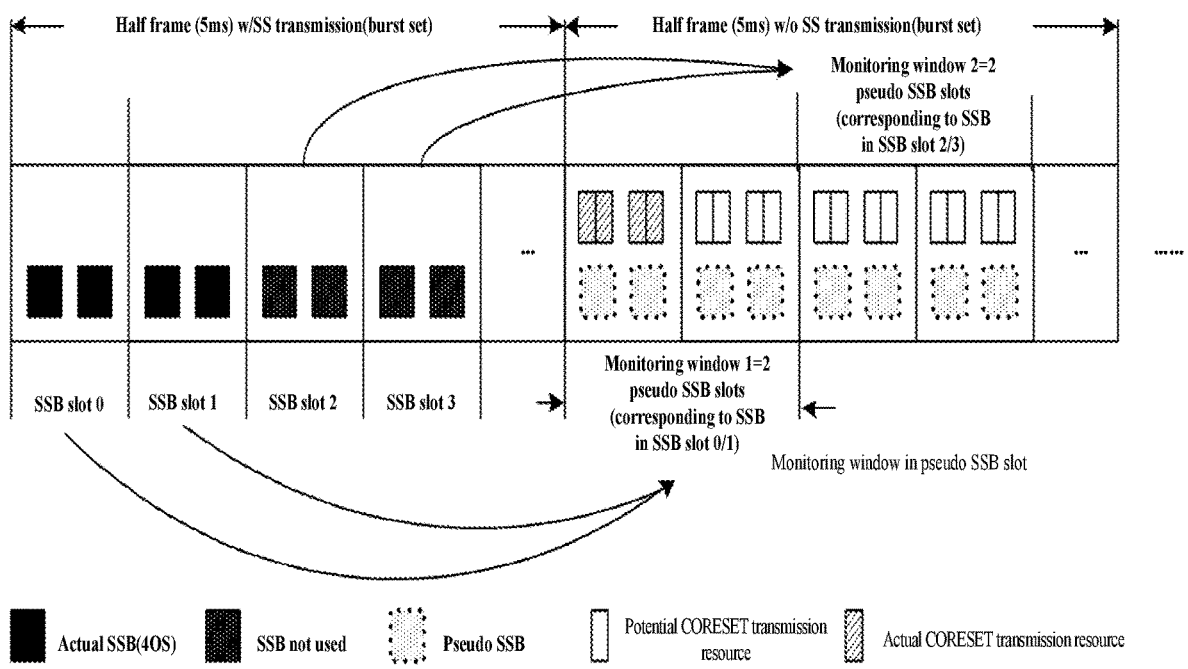
FIG. 26 is a schematic diagram that a plurality of synchronization signal blocks corresponds to one CORESET monitoring window according the present embodiment.

FIG. 26 is a schematic diagram that a plurality of synchronization signal blocks corresponds to one CORESET monitoring window according the present embodiment. As shown in FIG. 26, the plurality of synchronization signal blocks correspond to one CORESET monitoring window. In an embodiment, 4 slots containing synchronization signal blocks include 8 synchronization signal block resources, in this case, the first 4 synchronization signal blocks are actually transmitted, 4 synchronization signal blocks in the first 2 slots correspond to the first CORESET monitoring window (corresponding to the first 2 pseudo synchronization signal block slots in time domain), and 4 synchronization signal blocks in the last two slots correspond to the second CORESET monitoring window (corresponding to the third and fourth pseudo synchronization signal block slots in time domain); and for a terminal, when one of the first 4 SSBs is received, it is necessary to attempt to receive the corresponding CORESET on 8 CORESET monitoring opportunities in the monitoring window 1, and when one of the last 4 SSBs is received, it is necessary to attempt to receive the corresponding CORESET on 8 CORESET monitoring opportunities in the monitoring window 2.

An indication bit may be introduced into a CORESET configuration information indication field of the PBCH to indicate a time domain offset between adjacent CORESET monitoring windows of a current carrier to the terminal. For example, 2 bits are used for indication, '00' represents 'the time domain offset between the adjacent monitoring windows is 0', '01' represents 'the time domain offset between the adjacent monitoring windows is a monitoring window length', '10' represents 'the time domain offset between the adjacent monitoring windows is 1/X of the monitoring window length', and '11' represents 'state reservation'. X is an integer greater than 1, and a value thereof may be specified in a protocol or indicated by a signaling.

In the foregoing indication manner, it is necessary to introduce 2-bit indication overhead, and in order to reduce this overhead, it is also possible to limit the type of the time domain offset between the adjacent monitoring windows according to different kinds of time domain duration of the monitoring window. For example, when the monitoring window length is 1 slot, it is specified that there are only two possibilities for the time domain offset between the adjacent monitoring windows: the time domain offset between the adjacent monitoring windows is the monitoring window length (that is, the adjacent monitoring windows overlap, and configured continuously), or the time domain offset between the adjacent monitoring windows is 1/X of the time domain duration of the monitoring window (that is, the adjacent monitoring windows partially overlap). In this case, only 1 bit is needed to indicate the offset value, for example, '0' represents 'the time domain offset between the adjacent monitoring windows is a monitoring window length', and '1' represents 'the time domain offset between the adjacent monitoring windows is 1/X of the monitoring window length'. Similarly, X is an integer greater than 1, and a value thereof may be specified in a protocol or indicated by a signaling.

For a case that the monitoring window length is greater than 1 slot, it is specified that there are only two possibilities for the time domain offset between the adjacent monitoring windows: the time domain offset between the adjacent monitoring windows is 0 (that is, the adjacent monitoring windows completely overlap), or the time domain offset between the adjacent monitoring windows is 1/X of the monitoring window length (that is, the adjacent monitoring windows partially overlap). In this case, only 1 bit is needed to indicate the offset value, for example, '0' represents 'the time domain offset between the adjacent monitoring windows is 0', and '1' represents 'the time domain offset between the adjacent monitoring windows is 1/X of the monitoring window length'. Similarly, X is an integer greater than 1, and a value thereof may be specified in a protocol or indicated by a signaling.

In the present application, the technical features in the respective implementation manners may be used in combination in one implementation manner without conflict. Each implementation manner is merely an optimal implementation manner of the present application.

This embodiment provides a transmission method of common control information block configuration information, and with this solution, time and frequency domain resource positions of a control resource set can be effectively indicated without affecting combined reception of PBCHs (that is, it is ensured that the PBCH content in each SS block is the same). In addition, by configuring time domain duration of a control resource set monitoring window and a time domain offset between monitoring windows corresponding to adjacent SS blocks, transmission resources of a common control block are more flexible, and the impact of burst traffic transmission on the common control block transmission is well avoided.

Embodiment 4

An embodiment of the present application further provides a storage medium, and the storage medium includes a stored program, where the method according to any one of the foregoing is executed when the foregoing program is run.

In the present embodiment, the foregoing storage medium may be configured to store program codes for executing the following step S1 and step S2:

In the step S1, configuration information of a control resource set is carried on a physical broadcast channel; where the configuration information is used to indicate to a terminal at least one of the following of the control resource set: time domain position information and frequency domain position information.

In the step S2, the control resource set is transmitted to the terminal according to the configuration information.

In an embodiment, in the present embodiment, the foregoing storage medium may include, but is not limited to: any medium that can store program codes, such as a USB flash drive, a read-only memory (Read-Only Memory, ROM), a random access memory (Random Access Memory, RAM), a removable hard disk, a magnetic disk, or an optical disk.

An embodiment of the present application further provides a processor, and the processor is configured to run a program, where the step according to any one of the foregoing methods is executed when the program is run.

In the present embodiment, the foregoing program is used to execute the following step S1 and step S2:

In the step S1, configuration information of a control resource set is carried on a physical broadcast channel; where the configuration information is used to indicate to a terminal at least one of the following of the control resource set: time domain position information and frequency domain position information.

In the step S2, the control resource set is transmitted to the terminal according to the configuration information.

In an embodiment, the specific example in the present embodiment may refer to the example described in the foregoing embodiment and optional implementation manner, and it will not be repeated redundantly herein.

Obviously, those skilled in the art should understand that the foregoing each module or each step of the present application may be implemented by universal computing devices, and they may be centralized on a single computing device or distributed over a network consisting of a plurality of computing devices; in an embodiment, they may be implemented by executable program codes of a computing device, and thus they can be stored in a storage device for execution by the computing device; and in some cases, the illustrated or described steps may be executed in an order different from the one herein, or they are respectively fabricated into individual integrated circuit modules, or a plurality of modules or steps thereof are implemented by being fabricated into a single integrated circuit module. Thus, the present application is not limited to any specific combination of hardware and software.

What is claimed is:

1. A method, comprising:
    transmitting, to a terminal, configuration information of a common control resource set on a physical broadcast channel,
    wherein the common control resource set is for paging information,
    the configuration information indicating time domain position information of the common control resource set,
    the time domain position information of the common control resource set including: (1) information of a first slot in which the common control resource set is located, (2) a starting symbol index of at least one symbol occupied by the common control resource set in the first slot, and (3) a number of the at least one symbol occupied by the common control resource set in the first slot,
    the at least one symbol occupied by the common control resource set in the first slot including at least one of the third symbol, the fifth symbol, the seventh symbol, or the ninth symbol of the first slot; and
    transmitting, to the terminal, the common control resource set according to the configuration information.

2. The method of claim 1, wherein the first slot in which the common control resource set is located contains a synchronization signal block (SSB).

3. The method of claim 2, wherein the common control resource set is transmitted in a second slot not containing the SSB, and a same resource mapping rule is applied for the common control resource set in both the first slot containing the SSB and the second slot not containing the SSB.

4. The method of claim 2, wherein the starting symbol index of the at least one symbol occupied by the common control resource set in the first slot and a starting symbol index of symbols occupied by the SSB in the first slot are the same.

5. A method, comprising:
    receiving, by a terminal, configuration information of a common control resource set on a physical broadcast channel,
    wherein the common control resource set is for paging information,
    the configuration information indicating time domain position information of the common control resource set,
    the time domain position information of the common control resource set including: (1) information of a first slot in which the common control resource set is located, (2) a starting symbol index of at least one symbol occupied by the common control resource set in the first slot, and (3) a number of the at least one symbol occupied by the common control resource set in the first slot,
    the at least one symbol occupied by the common control resource set in the first slot including at least one of the third symbol, the fifth symbol, the seventh symbol, or the ninth symbol of the first slot; and receiving, by the terminal, the common control resource set according to the configuration information.

6. The method of claim 5, wherein the first slot in which the common control resource set is located contains a synchronization signal block (SSB).

7. The method of claim 6, wherein the common control resource set is transmitted in a second slot not containing the SSB, and a same resource mapping rule is applied for the common control resource set in both the first slot containing the SSB and the second slot not containing the SSB.

8. The method of claim 6, wherein the starting symbol index of the at least one symbol occupied by the common control resource set in the first slot and a starting symbol index of symbols occupied by the SSB in the first slot are the same.

9. A base station comprising at least one processor configured to:

transmit, to a terminal, configuration information of a common control resource set on a physical broadcast channel, wherein the common control resource set is for paging information, the configuration information indicating time domain position information of the common control resource set, the time domain position information of the common control resource set including: (1) information of a first slot in which the common control resource set is located, (2) a starting symbol index of at least one symbol occupied by the common control resource set in the first slot, and (3) a number of the at least one symbol occupied by the common control resource set in the first slot, the at least one symbol occupied by the common control resource set in the first slot including at least one of the third symbol, the fifth symbol, the seventh symbol, or the ninth symbol of the first slot; and transmit, to the terminal, the common control resource set according to the configuration information.

10. The base station of claim 9, wherein the first slot in which the common control resource set is located contains a synchronization signal block (SSB).

11. The base station of claim 10, wherein the common control resource set is transmitted in a second slot not containing the SSB, and a same resource mapping rule is applied for the common control resource set in both the first slot containing the SSB and the second slot not containing the SSB.

12. The base station of claim 10, wherein the starting symbol index of the at least one symbol occupied by the common control resource set in the first slot and a starting symbol index of symbols occupied by the SSB in the first slot are the same.

13. A terminal comprising at least one processor configured to:

receive configuration information of a common control resource set on a physical broadcast channel, wherein the common control resource set is for paging information, the configuration information indicating time domain position information of the common control resource set, the time domain position information of the common control resource set including: (1) information of a first slot in which the common control resource set is located, (2) a starting symbol index of at least one symbol occupied by the common control resource set in the first slot, and (3) a number of the at least one symbol occupied by the common control resource set in the first slot, the at least one symbol occupied by the common control resource set in the first slot including at least one of the third symbol, the fifth symbol, the seventh symbol, or the ninth symbol of the first slot; and receive the common control resource set according to the configuration information.

14. The terminal of claim 13, wherein the first slot in which the common control resource set is located contains a synchronization signal block (SSB).

15. The terminal of claim 14, wherein the common control resource set is transmitted in a second slot not containing the SSB, and a same resource mapping rule is applied for the common control resource set in both the first slot containing the SSB and the second slot not containing the SSB.

16. The terminal of claim 14, wherein the starting symbol index of the at least one symbol occupied by the common control resource set in the first slot and a starting symbol index of symbols occupied by the SSB in the first slot are the same.

* * * * *